`US009410745B2`

(12) United States Patent
Katoh et al.

(10) Patent No.: US 9,410,745 B2
(45) Date of Patent: Aug. 9, 2016

(54) HEAT EXCHANGER

(71) Applicant: DENSO CORPORATION, Kariya, Aichi-pref. (JP)

(72) Inventors: Yoshiki Katoh, Kariya (JP); Mitsuyoshi Saito, Hamamatsu (JP); Kenji Yamada, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 257 days.

(21) Appl. No.: 14/360,808

(22) PCT Filed: Nov. 28, 2012

(86) PCT No.: PCT/JP2012/007627
§ 371 (c)(1),
(2) Date: May 27, 2014

(87) PCT Pub. No.: WO2013/080534
PCT Pub. Date: Jun. 6, 2013

(65) Prior Publication Data
US 2014/0305159 A1     Oct. 16, 2014

(30) Foreign Application Priority Data

Nov. 30, 2011  (JP) ................................ 2011-262053
Nov. 14, 2012  (JP) ................................ 2012-250502

(51) Int. Cl.
*F28D 7/00*     (2006.01)
*F28F 9/02*     (2006.01)
(Continued)

(52) U.S. Cl.
CPC .......... *F28D 7/0008* (2013.01); *B60H 1/00328* (2013.01); *B60H 1/00342* (2013.01);
(Continued)

(58) Field of Classification Search
CPC ... F28D 7/008; F28D 1/0435; F28D 1/05391; F28D 2021/0091; F28D 2021/0085; F28F 9/0204; F28F 9/0278; F28F 9/262; B60H 1/00328; B60H 1/00342; B60H 1/3213; B60H 1/00921
USPC .............................................. 62/515; 165/157
See application file for complete search history.

(56) References Cited

U.S. PATENT DOCUMENTS 6,854,286 B2 *  2/2005  Bureau ............... B60H 1/00321
                                                        62/244
2003/0188857 A1  10/2003  Kawakubo et al.
(Continued)

FOREIGN PATENT DOCUMENTS

EP     1108575 A1    6/2001
JP     H0330068 U    3/1991
(Continued)

OTHER PUBLICATIONS

Office Action mailed Jul. 21, 2015 in the corresponding Japanese application No. 2012-250502 with English translation.
(Continued)

*Primary Examiner* — Mohammad M Ali
(74) *Attorney, Agent, or Firm* — Harness, Dickey & Pierce, P.L.C.

(57) ABSTRACT

In a heat exchanger, a refrigerant side header tank and a coolant side header tank which are connected with refrigerant tubes and coolant tubes include a plate header member, a communication intermediate plate member, a blocking intermediate plate member, and a tank header member. The communication intermediate plate member includes first and second fluid communication holes through which refrigerant and coolant flow, respectively. In this situation, with a simple configuration in that a part of the first and second fluid communication holes is blocked by the blocking intermediate plate member, a communication state between both tubes and internal spaces of the header tanks is regulated.

14 Claims, 19 Drawing Sheets

(51) Int. Cl.
  *F28F 9/26* (2006.01)
  *F28D 1/04* (2006.01)
  *F28D 1/053* (2006.01)
  *B60H 1/00* (2006.01)
  *F28D 21/00* (2006.01)
  *B60H 1/32* (2006.01)

(52) U.S. Cl.
  CPC .......... *F28D1/0435* (2013.01); *F28D 1/05391* (2013.01); *F28F 9/0204* (2013.01); *F28F 9/0278* (2013.01); *F28F 9/262* (2013.01); *B60H 1/00921* (2013.01); *B60H 1/3213* (2013.01); *F28D 2021/0085* (2013.01); *F28D 2021/0091* (2013.01); *F28F 2265/16* (2013.01)

(56) References Cited

U.S. PATENT DOCUMENTS

| | | | | |
|---|---|---|---|---|
| 2004/0031596 | A1* | 2/2004 | Nishida | B60H 1/3227 165/140 |
| 2008/0041095 | A1* | 2/2008 | Higashiyama | F25B 39/02 62/515 |
| 2008/0302131 | A1* | 12/2008 | Higashiyama | F25B 39/02 62/515 |
| 2009/0019885 | A1* | 1/2009 | Hoshino | F25B 39/02 62/515 |
| 2013/0061631 | A1 | 3/2013 | Katoh | |

FOREIGN PATENT DOCUMENTS

| | | |
|---|---|---|
| JP | H0433860 U | 3/1992 |
| JP | 11157326 A | 6/1999 |
| JP | 2000062446 A | 2/2000 |
| JP | 3960233 B2 | 8/2007 |
| JP | 2008151396 A | 7/2008 |
| JP | 2010096369 A | 4/2010 |
| JP | 2012007821 A | 1/2012 |
| WO | WO-2013080532 A1 | 6/2013 |
| WO | WO-2013080535 A1 | 6/2013 |

OTHER PUBLICATIONS

U.S. Appl. No. 14/360,779, filed May 27, 2014, Katoh.
U.S. Appl. No. 14/360,861, filed May 27, 2014, Katoh.
Office Action dated Nov. 24, 2015 issued in the corresponding JP application No. 2012-250502 in Japanese with English translation.
International Search Report and Written Opinion (in Japanese with English Translation) for PCT/JP2012/007627, mailed Jan. 15, 2013; ISA/JP.

* cited by examiner

WASTE HEAT RECOVERY OPERATION

HEAT EXCHANGER

CROSS REFERENCE TO RELATED APPLICATIONS

This application is a U.S. National Phase Application under 35 U.S.C. 371 of International Application No. PCT/JP2012/007627, filed on Nov. 28, 2012 and published in Japanese as WO/2013/080534 A1 on Jun. 6, 2013. This application is based on Japanese Patent Applications No. 2011-262053 filed on Nov. 30, 2011, and No. 2012-250502 filed on Nov. 14, 2012. The disclosures of all of the above applications are incorporated herein by reference.

TECHNICAL FIELD

The present disclosure relates to a combined heat exchanger configured to enable heat exchange among three types of fluids.

BACKGROUND ART

Conventionally, there has been known the combined heat exchanger configured to enable heat exchange among the three types of fluids. For example, Patent Document 1 discloses a heat exchanger that is mounted in a vehicle, and configured to enable both a heat exchange between a refrigerant of a refrigeration cycle device and a vehicle exterior air (outside air) and a heat exchange between the refrigerant and an engine coolant.

More specifically, the heat exchanger of Patent Document 1 is configured as a so-called tank and tube type heat exchanger having a refrigerant tubes which allow a refrigerant to flow therein, and a refrigerant tank that extends in a direction along which the tubes is stacked on each other, and collects or distributes the refrigerant flowing in the refrigerant tubes. The heat exchanger conducts a heat exchange between the refrigerant flowing in the refrigerant tubes and the outside air flowing around the refrigerant tubes.

Further, in the heat exchanger of Patent Document 1, a heat pipe connected to a coolant tank in which the engine coolant flows is arranged between the refrigerant tubes stacked on each other, and a heat exchange fin that enables a heat transfer between the refrigerant flowing in the refrigerant tubes and the engine coolant flowing in the heat pipe is arranged in an outside air passage formed between the refrigerant tubes and the heat pipe to exchange a heat between the refrigerant and the engine coolant.

Also, Patent Document 2 discloses means for communicating an internal space of the tube with an internal space of the tank through an intermediate plate member, etc. in manufacturing a heat exchanger of the tank and tube type. With the above configuration, in the heat exchanger of Patent Document 2, a communication state between the internal spaces of the respective tube and tank for distribution or collection, and a direction along which a fluid flowing in the tube flows can be easily adjusted.

Further, in the heat exchanger of Patent Document 2, a simple configuration in which fluid communication holes through which the fluid flows are provided in a simple plate-like member is adopted as the intermediate plate member, thereby improving a productivity as an overall heat exchanger while suppressing an increase in the manufacturing costs of the heat exchanger per se, which is caused by application of the intermediate plate member.

In the heat exchanger of Patent Document 1, in order to realize the heat exchange between the refrigerant and the outside air, and the heat exchange between the refrigerant and the coolant described above, the refrigerant tank and the coolant tank configured as different bodies are arranged adjacently in a flow direction of the outside air, and the heat pipe shaped to be bent in the vicinity of the coolant tank is applied. However, the application of a complicated shape curved in the vicinity of the coolant tank as the heat pipe could cause the degradation of the productivity of the heat exchanger.

On the contrary, in the heat exchanger of Patent Document 1, for example, even if the intermediate plate member and so on disclosed in Patent Document 2 intervenes in connection between the refrigerant tank and the refrigerant tubes, the communication state between the internal spaces of the respective tube and tank for distribution or collection, and the direction along which a fluid flowing in the tube flows cannot be adjusted. Further, the shape of the heat pipe cannot be changed. Therefore, the productivity as the overall heat exchanger could not be sufficiently improved.

PRIOR ART DOCUMENT

Patent Document

Patent Document 1: JP-A-11-157326
Patent Document 2: Japanese Patent No. 3960233

SUMMARY OF THE INVENTION

It is an objective of the present disclosure to sufficiently improve the productivity of a heat exchanger configured to realize a heat exchange among three types of fluids.

In order to achieve the above-described objective, in a first example of the present disclosure, a heat exchanger includes: a first heat exchange unit including first tubes through which a first fluid flows, and a first tank that extends in a stacking direction of the first tubes and collects or distributes the first fluid flowing through the first tubes, the first heat exchange unit performing heat exchange between the first fluid and a third fluid flowing on a periphery of the first tubes; a second heat exchange unit including second tubes through which a second fluid flows, and a second tank that extends in a stacking direction of the second tubes and collects or distributes the second fluid flowing through the second tubes, the second heat exchange unit performing heat exchange between the second fluid and the third fluid flowing on a periphery of the second tubes; a third fluid passage through which the third fluid flows; and an outer fin. At least one of the first tubes is arranged between the second tubes, and at least one of the second tubes is arranged between the first tubes. The third fluid passage is formed between the first tubes and the second tubes. The outer fin is arranged in the third fluid passage, facilitates the heat exchanges in both of the heat exchange units, and enables heat transfer between the first fluid flowing in the first tubes and the second fluid flowing in the second tubes. At least one of the first and second tanks includes a plate-shaped plate header member connected with one end side of the first and second tubes in a longitudinal direction thereof, a plate-shaped communication intermediate plate member, a plate-shaped blocking intermediate plate member, and a tank header member. The communication intermediate plate member has a first fluid communication hole through which the first fluid flows, and a second fluid communication hole through which the second fluid flows, and the first and second fluid communication holes penetrate through both plate surfaces of the communication intermediate plate member. The blocking intermediate plate member closes one of the first and second fluid communication holes, and has a communication hole that penetrates through both plate surfaces of the blocking intermediate plate member. The tank header member has an internal space that collects or distributes the first or second fluids. The other of the first and second fluid communication holes, and the communication hole communicate with each other, so that the internal space defined by the tank header member and one of the first tubes or second tubes communicate with each other. The one of the first and second fluid communication holes is closed by the blocking intermediate plate member, so that two of the other of the first tubes or second tubes, which are arranged adjacent to each other as one pair, communicate with each other. The plate surface of the plate header member and one plate surface of the communication intermediate plate member are joined to each other, and the other plate surface of the communication intermediate plate member and the plate surface of the blocking intermediate plate member are joined to each other, so that mixing of the first fluid flowing in the first fluid communication hole and the second fluid flowing in the second fluid communication hole is limited.

According to the above configuration, since at least one of the first or second tank is formed of the plate header member, the communication intermediate plate member, the blocking intermediate plate member, and the tank header member. When the internal space formed in the tank header member communicates with one of the first and second tubes, the internal space and the first or second tube can be connected to each other through the communication intermediate plate member and the blocking intermediate plate member.

Therefore, the communication state between the first and second tubes and the internal space formed in the tank header member, and the flow directions along which the first and second fluids flow in the first and second tubes can be easily regulated according to the positions and sizes of the first and second fluid communication holes provided in the communication intermediate plate member, and according to the positions of the first and second fluid communication holes blocked by the blocking intermediate plate member.

Further, the respective plate surfaces of the plate header member, the communication intermediate plate member, and the blocking intermediate plate member are joined to each other, thereby being capable of suppressing the mixture of the first fluid flowing in the first fluid communication hole with the second fluid flowing in the second fluid communication hole.

Therefore, the communication states between the first, second tubes, and the internal spaces within the first and second tanks, etc. can be regulated by the communication intermediate plate member and the blocking intermediate plate member each having a simple configuration in which only fluid communication holes are formed in the plate member.

As a result, the productivity of the heat exchanger configured to realize the heat exchange among the three types of fluids can be sufficiently improved.

In a second example of the present disclosure, regarding the heat exchanger according to the first example, the heat exchanger may further include a groove portion. The groove portion may be formed in at least one of the plate surface of the plate header member, the one or the other plate surface of the communication intermediate plate member, or the plate surface of the blocking intermediate plate member. The groove portion may be located between the first fluid communication hole and the second fluid communication hole which are adjacently arranged. The groove space formed within the groove portion may be continuously connected to an external space of the heat exchanger.

According to the above configuration, the first fluid or the second fluid leaked onto the joint surface (plate surface) in which the groove portion is formed is discharged to the exterior of the heat exchanger through the groove space formed within the groove portion. For that reason, one of the first fluid and the second fluid leaked onto the joint surface can be prevented from being mixed with the other fluid within the first fluid communication hole or the second fluid communication hole.

In a third example of the present disclosure, regarding the heat exchanger according to the first or second example, the heat exchanger may further include a groove portion. The groove portion may be formed in at least one of the plate surface of the plate header member, the one or the other plate surface of the communication intermediate plate member, or the plate surface of the blocking intermediate plate member. The groove portion may be located between the first fluid communication hole and the second fluid communication hole which are adjacently arranged, and the groove portion may be formed to extend to an end portion of the plate surface in the plate header member, the communication intermediate plate member, or the blocking intermediate plate member in which the groove portion is formed.

According to the above configuration, the groove portion is formed to extend from the region between the first fluid communication hole and the second fluid communication hole which are adjacently arranged to an end portion of the plate surface in which the groove portion is formed. Therefore, when the first fluid flowing in the first fluid communication hole, or the second fluid flowing in the second fluid communication hole is leaked from the respective joint surfaces of the plate header member, the communication intermediate plate member, and the blocking intermediate plate member, the first fluid or the second fluid can be guided to the end of the plate surface in which the groove portion is formed through the groove space formed in the groove portion.

The groove portion represents not only a portion formed by recessing the plate surface but also a portion formed by a through-hole (through-groove) that penetrates through both sides of the plate surface.

Specifically, in a fourth example of the present disclosure, the groove portion may be formed on the plate surface of the communication intermediate plate member. The groove portion may be located between the first fluid communication hole and the second fluid communication hole which are adjacently arranged. The groove portion may be formed to extend to an end portion of the plate surface in which the groove portion is formed.

In a fifth example of the present disclosure, regarding the heat exchanger according to the third or fourth example, a groove space formed in the groove portion may communicate with an external space of the heat exchanger.

According to the above configuration, when the first fluid flowing in the first fluid communication hole, or the second fluid flowing in the second fluid communication hole is leaked from the respective joint surfaces of the plate header member, the communication intermediate plate member, and the blocking intermediate plate member, the first fluid or the second fluid can be guided to an external space through the groove space formed in the groove portion.

The external space of the heat exchanger represents an external of the heat exchanger, and specifically, for example, where the outside air (air) is present in the space, and for example, if the third fluid is the outside air (air), the third fluid may flow in the space. Therefore, the third fluid passage is also included in the external space of the heat exchanger.

In a sixth example of the present disclosure, regarding the heat exchanger according to the second or fifth example, an end of the groove portion may be positioned visibly.

According to the above configuration, since the end of the groove portion is visibly positioned, it can be easily confirmed the leakage of the first fluid flowing in the first fluid communication hole, or the second fluid flowing in the second fluid communication hole from the end of the groove portion. Further, a manufacturing failure can be easily detected by confirming the leakage of the fluid from the end of the groove portion after manufacturing the heat exchanger.

In a seventh example of the present disclosure, regarding the heat exchanger according to the second or sixth example, at least two members of the plate header member, the communication intermediate plate member, or the blocking intermediate plate member may be joined to each other. The groove portion may be formed in each of the joined plates surface of the at least two members. Parts of the groove portions formed in the at least two members may communicate with each other to provide a single groove space within the groove portion. The groove space may be continuously connected to the external space of the heat exchanger.

According to the above configuration, even if the groove space within the groove portion cannot be continuous to the external space by merely forming the groove portion in one member, the groove space can be continuous to the external space.

In an eighth example of the present disclosure, regarding the heat exchanger according to any one of the second to seventh example, the groove portion may include a through-groove that penetrates through one member, in which the groove portion is formed, among the plate header member, the communication intermediate plate member, and the blocking intermediate plate member.

In a ninth example of the present disclosure, regarding the heat exchanger according to the eighth example, the through-groove may be open toward the first and second tubes, or open toward a side opposite from the first and second tubes, and may communicate with the external space.

According to the above configuration, the groove portion can be formed so that the first fluid or the second fluid leaked into the groove space is easily discharged.

In a tenth example of the present disclosure, regarding the heat exchanger according to any one of the second to ninth example, the groove portion may be provided along a curved or a polygonal line.

In an eleventh example of the present disclosure, regarding the heat exchanger according to any one of the first to tenth example, the first and second tubes may be arranged in two rows with respect to the flow direction of the third fluid. One of the first or second fluid communication hole may be closed by the blocking intermediate plate member so that the other of the first tubes or second tubes arranged on an upstream side in the flow direction of the third fluid and the other of the first tubes or second tubes arranged on a downstream side in the flow direction of the third fluid communicate with each other.

According to the above configuration, specifically, the first and second tubes communicating with the internal spaces of the first and second tanks can be easily determined. Also, the flow directions of the first and second fluids in the first and second tubes arranged on the upstream side in the flow direction of the third fluid, and the flow directions of the first and second fluids in the first and second tubes arranged on the downstream side in the flow direction of the third fluid can be easily determined.

In a twelfth example of the present disclosure, regarding the heat exchanger according to any one of the first to eleventh example, the heat exchanger may be used as an evaporator that evaporates a refrigerant in a vapor compression refrigeration cycle. The first fluid may be a refrigerant of the refrigeration cycle, the second fluid may be a heat medium that absorbs heat of an external heat source, and the third fluid may be air.

In a thirteenth example of the present disclosure, regarding the heat exchanger according to any one of the first to eleventh example, the heat exchanger may be used as a radiator that radiates a refrigerant discharged by a compressor in a vapor compression refrigeration cycle. The first fluid may be a refrigerant of the refrigeration cycle, the second fluid may be a heat medium that absorbs heat of an external heat source, and the third fluid may be air.

In a fourteenth example of the present disclosure, regarding the heat exchanger according to any one of the first to eleventh example, the heat exchanger may be applied to a vehicle cooling system. The first fluid may be a heat medium that absorbs heat of a first in-vehicle device associated with heat generation during actuation, the second fluid may be a heat medium that absorbs heat of a second in-vehicle device associated with heat generation during actuation, and the third fluid may be air.

BRIEF DESCRIPTION OF THE DRAWINGS

FIG. 17($b$) is a cross-sectional view taken along a line B-B in FIG. 17($a$).

FIG. 20($b$) is a cross-sectional view taken along a line C-C in FIG. 20($a$).

FIG. 23($b$) is a cross-sectional view taken along a line D-D in FIG. 23($a$).

EMBODIMENTS FOR EXPLOITATION OF THE INVENTION

Figure 1:
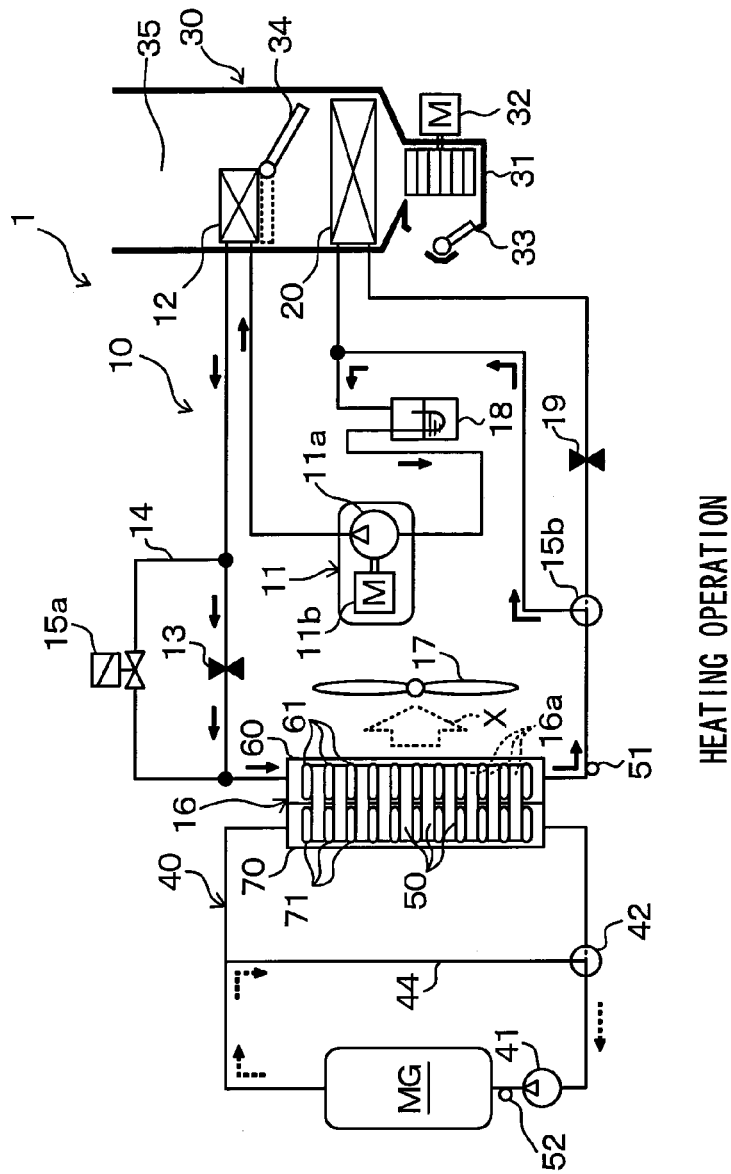
FIG. 1 is a schematic view illustrating heating operation of a vehicle air conditioner including a heat exchanger according to a first embodiment of the present disclosure.

Multiple embodiments for implementing the present disclosure will be described with reference to the drawings. In the respective embodiments, parts corresponding to items described in preceding embodiments are denoted by the same reference symbols, and a repetitive description thereof may be omitted. In the respective embodiments, when only a part of the configuration is described, another embodiment described precedingly can be applied to the other portions of the configuration. Also, in the subsequent embodiments, parts corresponding to the items described in the preceding embodiment are denoted by reference symbols different in only hundreds or higher digit to express a correspondence relationship, and a repetitive description thereof may be omitted. In the respective embodiments, in addition to the combinations of the respective parts which can be explicitly specifically combined together, the respective embodiments can be partially combined together even if not explicitly described, if no problem particularly occurs in the combination.

(First Embodiment)

A first embodiment according to the present disclosure will be described with reference to FIGS. 1 to 8. In the present embodiment, a heat exchanger 16 according to the present disclosure is applied to a heat pump cycle 10 that regulates a temperature of a vehicle interior blowing air in a vehicle air conditioner 1. FIGS. 1 to 4 are diagrams illustrating an overall configuration of the vehicle air conditioner 1 according to the present embodiment. The vehicle air conditioner 1 is applied to a so-called hybrid electric vehicle that obtains a drive force for vehicle travel from an internal combustion engine (engine) and a travel electric motor MG.

The hybrid electric vehicle runs or stops the engine according to a travel load of the vehicle, and can switch between a travel state in which the vehicle obtains the drive force from both the engine and the travel electric motor MG, and a travel state in which the vehicle stops the engine and obtains the drive force from only the travel electric motor MG to travel. With the above configuration, the hybrid electric vehicle can improve a vehicle fuel consumption as compared with normal vehicles that obtain the drive force for vehicle travel from only the engine.

The heat pump cycle 10 is configured by a fluid circulating circuit in which a refrigerant as a first fluid circulates. Specifically, the heat pump cycle 10 is a vapor compression refrigeration cycle that performs a function of heating or cooling the vehicle interior blowing air blown into a vehicle interior which is a space to be air-conditioned, in the vehicle air conditioner 1. That is, the heat pump cycle 10 switches a refrigerant passage to another so as to execute an air heating operation (heating operation) for heating the vehicle interior blowing air which is a fluid to be subjected to a heat exchange to heat the vehicle interior, and an air cooling operation (cooling operation) for cooling the vehicle interior blowing air to cool the vehicle interior.

Further, the heat pump cycle 10 can change a flow rate of a refrigerant, a coolant, or an outside air flowing in the heat exchanger 16 as will be described later, to thereby execute the defrosting operation for melting and removing frost attached to a vehicle exterior heat exchange unit 60 of the heat exchanger 16 during the heating operation, and the waste heat recovery operation for allowing the refrigerant to absorb a heat quantity of the travel electric motor MG as an external heat source during the heating operation. In the overall configuration diagrams of the heat pump cycle 10 illustrated in FIGS. 1 to 4, flows of the refrigerant in the respective operation are indicated by solid arrows.

Also, the heat pump cycle 10 according to the present embodiment applies a general fluorocarbon refrigerant as the refrigerant, and configures a subcritical refrigeration cycle in which a high pressure side refrigerant pressure does not exceed a critical pressure of the refrigerant. Further, a refrigerant oil for lubricating a compressor 11 is mixed in the refrigerant, and a part of the refrigerant oil circulates in the cycle together with the refrigerant.

First, the compressor 11 is an electric compressor which is arranged within an engine room, sucks, compresses, and discharges the refrigerant in the heat pump cycle 10, and drives a fixed displacement compressor 11$a$ having a fixed discharge capacity by an electric motor 11$b$. As the fixed displacement compressor 11$a$, various compression mechanisms such as a scroll compression mechanism or a vane compression mechanism can be applied specifically.

The electric motor 11b is controlled in the operation (rotating speed) according to a control signal output from an air conditioning control device which will be described later, and may be applied with any type of an AC motor and a DC motor. A refrigerant discharge capability of the compressor 11 is changed by controlling the rotating speed of the electric motor 11b. Therefore, in the present embodiment, the electric motor 11b configures a discharge capability changing device of the compressor 11.

A refrigerant discharge port of the compressor 11 is connected with a refrigerant inlet side of a vehicle interior condenser 12 as a use side heat exchanger. The vehicle interior condenser 12 is a heat exchanger for heating which is arranged within a casing 31 of a vehicle interior air conditioning unit 30 in the vehicle air conditioner 1, and exchange a heat between a high-temperature and high-pressure refrigerant flowing in the vehicle interior condenser 12 and the vehicle interior blowing air that has passed through a vehicle interior evaporator 20 which will be described later. A detailed configuration of the vehicle interior air conditioning unit 30 will be described later.

A refrigerant output side of the vehicle interior condenser 12 is connected with a heating fixed aperture 13 as a decompressing device for heating operation for decompressing and expanding the refrigerant flowing out of the vehicle interior condenser 12 during the heating operation. As the heating fixed aperture 13, an orifice or a capillary tube can be applied. An output side of the heating fixed aperture 13 is connected with a refrigerant inlet side of the vehicle exterior heat exchange unit 60 in the combined heat exchanger 16.

Further, a refrigerant outlet side of the vehicle interior condenser 12 is connected with a fixed aperture bypass passage 14 that allows the refrigerant flowing out of the vehicle interior condenser 12 to bypass the heating fixed aperture 13, and guides the refrigerant toward the vehicle exterior heat exchange unit 60 of the heat exchanger 16. An on-off valve 15a that opens and closes the fixed aperture bypass passage 14 is arranged in the fixed aperture bypass passage 14. The on-off valve 15a is an electromagnetic valve whose open/close operation is controlled by a control voltage output from the air conditioning control device.

Also, a pressure loss generated when the refrigerant passes through the on-off valve 15a is extremely smaller than a pressure loss generated when the refrigerant passes through the fixed aperture 13. Therefore, the refrigerant flowing out of the vehicle interior condenser 12 flows into the vehicle exterior heat exchange unit 60 of the heat exchanger 16 through the fixed aperture bypass passage 14 when the on-off valve 15a is opened. The refrigerant flows into the vehicle exterior heat exchange unit 60 of the heat exchanger 16 through the heating fixed aperture 13 when the on-off valve 15a is closed.

With the above operation, the on-off valve 15a can switch the refrigerant passage of the heat pump cycle 10 to another. Therefore, the on-off valve 15a according to the present embodiment functions as a refrigerant passage switching device. As the refrigerant passage switching device, there may be applied an electric three-way valve that switches between a refrigerant circuit that connects the vehicle interior condenser 12 outlet side and the heating fixed aperture 13 inlet side, and a refrigerant circuit that connects between the vehicle interior condenser 12 outlet side and the fixed aperture bypass passage 14 inlet side.

The heat exchanger 16 is arranged within the engine room, and the vehicle exterior heat exchange unit 60 in the heat exchanger 16 is a heat exchange unit that performs a function of exchanging a heat between the refrigerant flowing in the vehicle exterior heat exchange unit 60 and the outside air blown by an air blowing fan 17. Further, the vehicle exterior heat exchange unit 60 functions as an evaporation heat exchange unit that evaporates a low pressure refrigerant to exercise a heat absorption action during the heating operation, and functions as a radiation heat exchange unit that radiates a high pressure refrigerant during the cooling operation.

Also, the air blowing fan 17 is an electric blower whose operating rate, that is, rotating speed (blowing air volume) is controlled by the control voltage output from the air conditioning control device. Further, in the heat exchanger 16 according to the present embodiment, the above-mentioned vehicle exterior heat exchange unit 60 is integrated with a radiator unit 70 that exchanges a heat between the coolant circulating in a coolant circulation circuit 40 to cool the travel electric motor MG, and the outside air blown from the air blowing fan 17.

For that reason, the air blowing fan 17 according to the present embodiment configures a vehicle exterior blowing device for blowing the outside air toward both the vehicle exterior heat exchange unit 60 and the radiator unit 70 in the heat exchanger 16. The detailed configuration of the coolant circulation circuit 40, and the detailed configuration of the combined heat exchanger 16 that integrates the vehicle exterior heat exchange unit 60 and the radiator unit 70 together will be described later.

An outlet side of the vehicle exterior heat exchange unit 60 in the heat exchanger 16 is connected with an electric three-way valve 15b. The electric three-way valve 15b is controlled in operation by the control voltage output from the air conditioning control device, and configures the refrigerant passage switching device together with the above-mentioned on-off valve 15a.

Specifically, the three-way valve 15b switches the passage to a refrigerant passage that connects an outlet side of the vehicle exterior heat exchange unit 60 and an inlet side of an accumulator 18 during the heating operation. The three-way valve 15b switches the passage to a refrigerant passage that connects the outlet side of the vehicle exterior heat exchange unit 60 and an inlet side of a cooling fixed aperture 19 during the cooling operation. The cooling fixed aperture 19 is a decompressing device for the cooling operation for decompressing and expanding the refrigerant flowing from the vehicle exterior heat exchange unit 60 during the cooling operation, and a basic configuration thereof is identical with that of the heating fixed aperture 13.

An outlet side of the cooling fixed aperture 19 is connected with a refrigerant inlet side of the vehicle interior evaporator 20. The vehicle interior evaporator 20 is a cooling heat exchanger that is arranged upstream of the vehicle interior condenser 12 along an air flow within the casing 31 of the vehicle interior air conditioning unit 30, and exchanges the heat between the refrigerant flowing therein and an vehicle interior blowing air to cool the vehicle interior blowing air.

A refrigerant outlet side of the vehicle interior evaporator 20 is connected with an inlet side of the accumulator 18. The accumulator 18 is a gas-liquid separator for a low pressure side refrigerant, which separates gas and liquid of the refrigerant flowing into the accumulator 18 from each other to store an excess refrigerant within the cycle therein. A gas-liquid refrigerant outlet of the accumulator 18 is connected with a suction side of the compressor 11. Therefore, the accumulator 18 performs a function of preventing a liquid-phase refrigerant from being sucked into the compressor 11, and preventing a liquid compression of the compressor 11.

Subsequently, the vehicle interior air conditioning unit 30 will be described. The vehicle interior air conditioning unit 30 is arranged inside of a dashboard (instrument panel) in a vehicle interior frontmost portion, and houses a blower 32, the above-mentioned vehicle interior condenser 12, and the vehicle interior evaporator 20 within the casing 31 forming an outer envelope thereof.

The casing 31 forms an air passage of the vehicle interior blowing air blown into the vehicle interior, and is molded in resin (for example, polypropylene) having a certain level of elasticity, and excellent in strength. An inside/outside air switching device 33 that selectively introduces the vehicle interior air (inside air) and the outside air is arranged most upstream of the vehicle interior blowing air flow within the casing 31.

The inside/outside air switching device 33 is formed with an inside air introduction port for introducing the inside air into the casing 31, and an outside air introduction port for introducing the outside air. Further, an inside/outside air switching door that continuously regulates opening areas of the inside air introduction port and the outside air introduction port to change an air volume ratio of an air volume of the inside air to an air volume of the outside air is arranged within the inside/outside air switching device 33.

The blower 32 that blows the air sucked through the inside/outside air switching device 33 toward the vehicle interior through the inside/outside air switching device 33 is arranged downstream of the inside/outside air switching device 33 along the air flow. The blower 32 is an electric blower that drives a centrifugal multi-blade fan (sirocco fan) by an electric motor, whose rotating speed (blowing quantity) is controlled by the control voltage output from the air conditioning control device.

The vehicle interior evaporator 20 and the vehicle interior condenser 12 are arranged downstream of the blower 32 in the air flow in this described order with respect to a flow of the vehicle interior blowing air. In other words, the vehicle interior evaporator 20 is arranged upstream of the vehicle interior condenser 12 along the air flow of the vehicle interior blowing air.

Further, an air mix door 34 that regulates a volume ratio of the air that passes through the vehicle interior condenser 12 to the blowing air that has passed through the vehicle interior evaporator 20 is disposed downstream of the vehicle interior evaporator 20 along the air flow and upstream of the vehicle interior condenser 12 along the air flow. Also, a mixture space 35 that mixes the blowing air which is heat-exchanged with the refrigerant and heated by the vehicle interior condenser 12 with the blowing air that bypasses the vehicle interior condenser 12 and is not heated is disposed downstream of the vehicle interior condenser 12 along the air flow.

A wind outlet that blasts out air-conditioned wind mixed in the mixture space 35 toward the vehicle interior which is a space to be cooled is arranged most downstream of the casing 31 along the air flow. Specifically, as the wind outlet, there are provided a face wind outlet that blows out the air-conditioned wind toward an upper body of a passenger within the vehicle interior, a foot wind outlet that blows out the air-conditioned wind toward feet of the passenger, and a defroster wind outlet that blows out the air-conditioned wind toward an inside surface of a vehicle front window glass (all not shown).

Therefore, the rate of air volume allowed to pass through the vehicle interior condenser 12 is regulated by the air mix door 34 to regulate a temperature of the air-conditioned wind mixed in the mixture space 35, and the temperature of the air-conditioned wind blown from the respective wind outlets is regulated. That is, the air mix door 34 configures a temperature regulating device for regulating the temperature of the air-conditioned wind to be blown into the vehicle interior.

In other words, the air mix door 34 performs a function as a heat exchange quantity regulating device for regulating a heat exchange quantity between the compressor 11 discharge refrigerant and the vehicle interior blowing air in the vehicle interior condenser 12 configuring the use side heat exchanger. The air mix door 34 is driven by a servo motor not shown whose operation is controlled according to the control signal output from the air conditioning control device.

Further, a face door that regulates an opening area of the face wind outlet, a foot door that regulates an opening area of the face wind outlet, and a defroster door (all not shown) that regulates an opening area of the defroster wind outlet are arranged upstream of the face wind outlet, the foot wind outlet, and the defroster wind outlet along the air flow, respectively.

The face door, the foot door, and the defroster door configure a wind outlet mode switching device for switching a wind outlet mode to another. The face door, the foot door, and the defroster door are driven by a servo motor not shown which is controlled in operation according to the control signal output from the air conditioning control device through a link mechanism, etc.

Subsequently, a description will be given of the coolant circulation circuit 40 that circulates the coolant as a second fluid which is a material different in type from the refrigerant used in the heat pump cycle 10. As illustrated in FIGS. 1 to 4, the coolant circulation circuit 40 is a fluid circulation circuit different from the heat pump cycle 10. Specifically, the coolant circulation circuit 40 is a cooling medium circulation circuit that circulates a coolant (for example, ethylene glycol aqueous solution) as the cooling medium (heating medium) in a coolant passage formed within the travel electric motor MG which is one of in-vehicle devices that generate heat during operation to cool the travel electric motor MG.

A coolant pump 41, an electric three-way valve 42, the radiator unit 70 of the combined heat exchanger 16, and a bypass passage 44 that bypasses the radiator unit 70, and allows the coolant to flow therein are arranged in the coolant circulation circuit 40.

The coolant pump 41 is an electric pump that pumps the coolant into a coolant passage formed within the travel electric motor MG in the coolant circulation circuit 40, whose rotating speed (flow rate) is controlled according to the control signal output from the air conditioning control device. Therefore, the coolant pump 41 functions as a cooling capability regulating device for changing a flow rate of the coolant that cools the travel electric motor MG to regulate a cooling capability.

The three-way valve 42 switches between a cooling medium circuit that connects an inlet side of the coolant pump 41 and an outlet side of the radiator unit 70 to allow the coolant to flow into the radiator unit 70, and a cooling medium circuit that connects the inlet side of the coolant pump 41 and an outlet side of the bypass passage 44 to allow the coolant to bypass the radiator unit 70. The three-way valve 42 is controlled in the operation according to the control voltage output from the air conditioning control device, and configures a circuit switching device of the cooling medium circuit.

Figure 2:
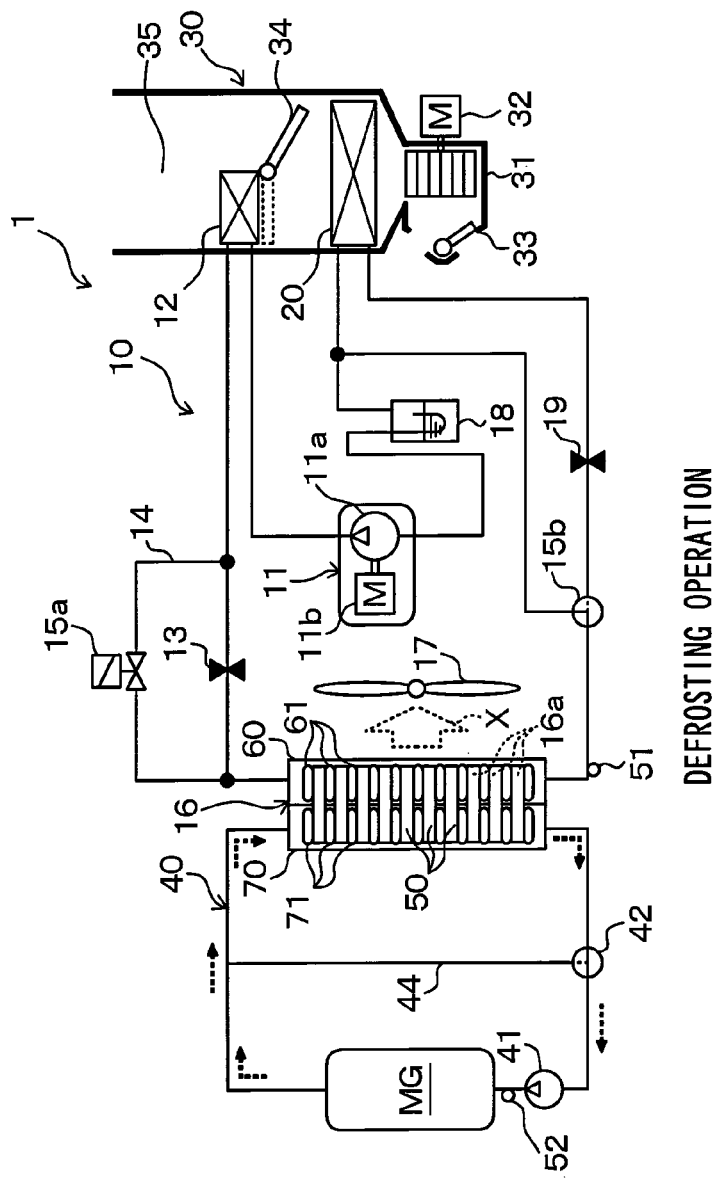
FIG. 2 is a schematic view illustrating defrosting operation of the vehicle air conditioner including the heat exchanger according to the first embodiment.

That is, the coolant circulation circuit 40 according to the present embodiment can switch between a cooling medium circuit that circulates the coolant in the stated order of the coolant pump 41, the travel electric motor MG, the bypass passage 44, and the coolant pump 41 as indicated by dashed arrows in FIG. 1, etc., and a cooling medium circuit that circulates the coolant in the stated order of the coolant pump 41, the travel electric motor MG, the radiator unit 70, and the coolant pump 41 as indicated by dashed arrows in FIG. 2, etc.

Therefore, when the three-way valve 42 switches to the cooling medium circuit that allows the coolant to flow while bypassing the radiator unit 70 during the actuation of the travel electric motor MG, the coolant increases a temperature thereof without radiating the heat by the radiator unit 70. That is, when the three-way valve 42 switches to the cooling medium circuit that allows the coolant to flow while bypassing the radiator unit 70, the heat quantity (the amount of heat generation) of the travel electric motor MG is stored in the coolant.

On the other hand, when the three-way valve 42 switches to the cooling medium circuit that allows the coolant to flow in the radiator unit 70 and flow during the actuation of the travel electric motor MG, the coolant flows into the radiator unit 70, and exchanges a heat with the outside air blown from the air blowing fan 17. Further, in the heat exchanger 16 according to the present embodiment, the coolant that has flowed into the radiator unit 70 can exchange the heat with not only the outside air but also the refrigerant flowing in the vehicle exterior heat exchange unit 60.

Figure 5:
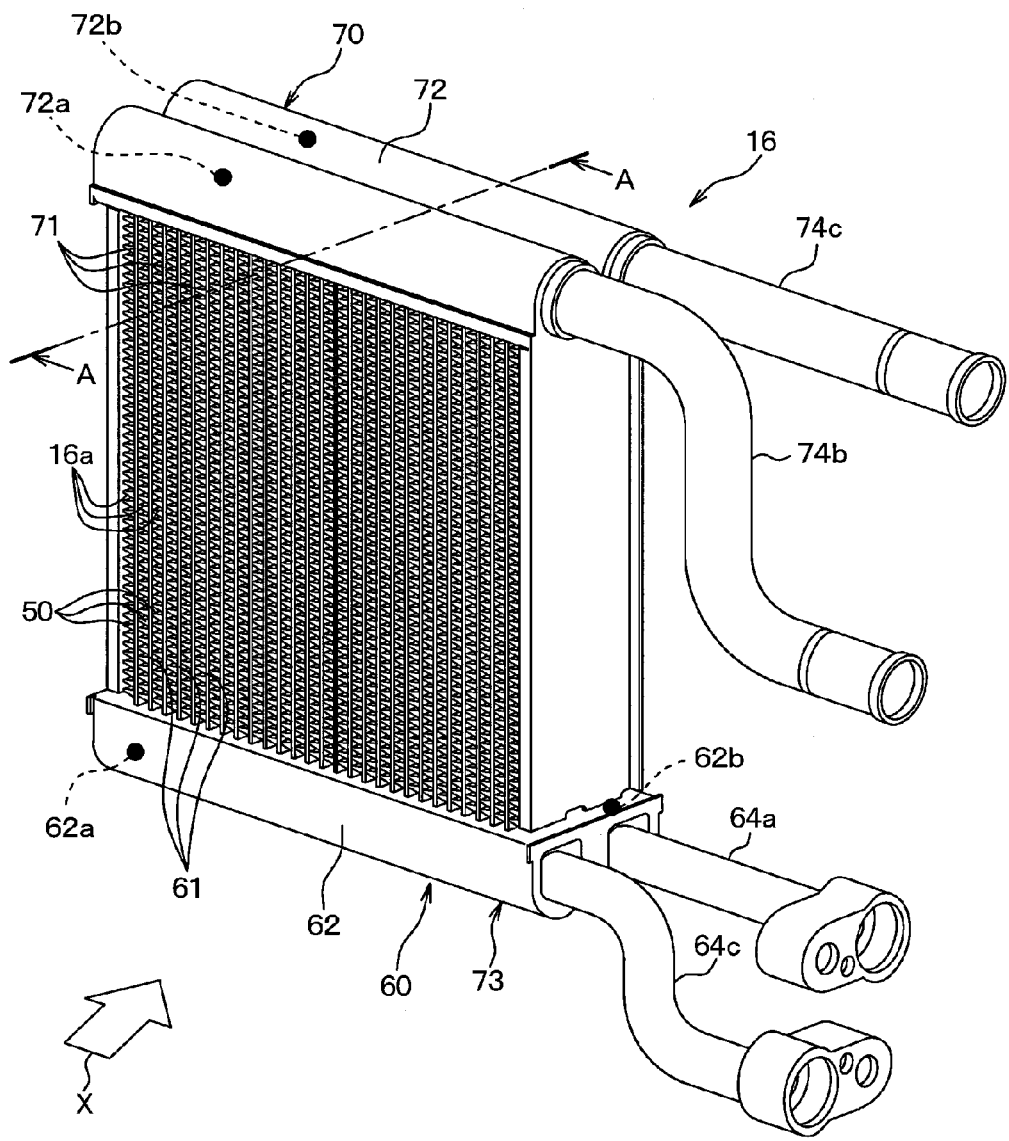
FIG. 5 is a perspective view of the heat exchanger according to the first embodiment.
Figure 6:
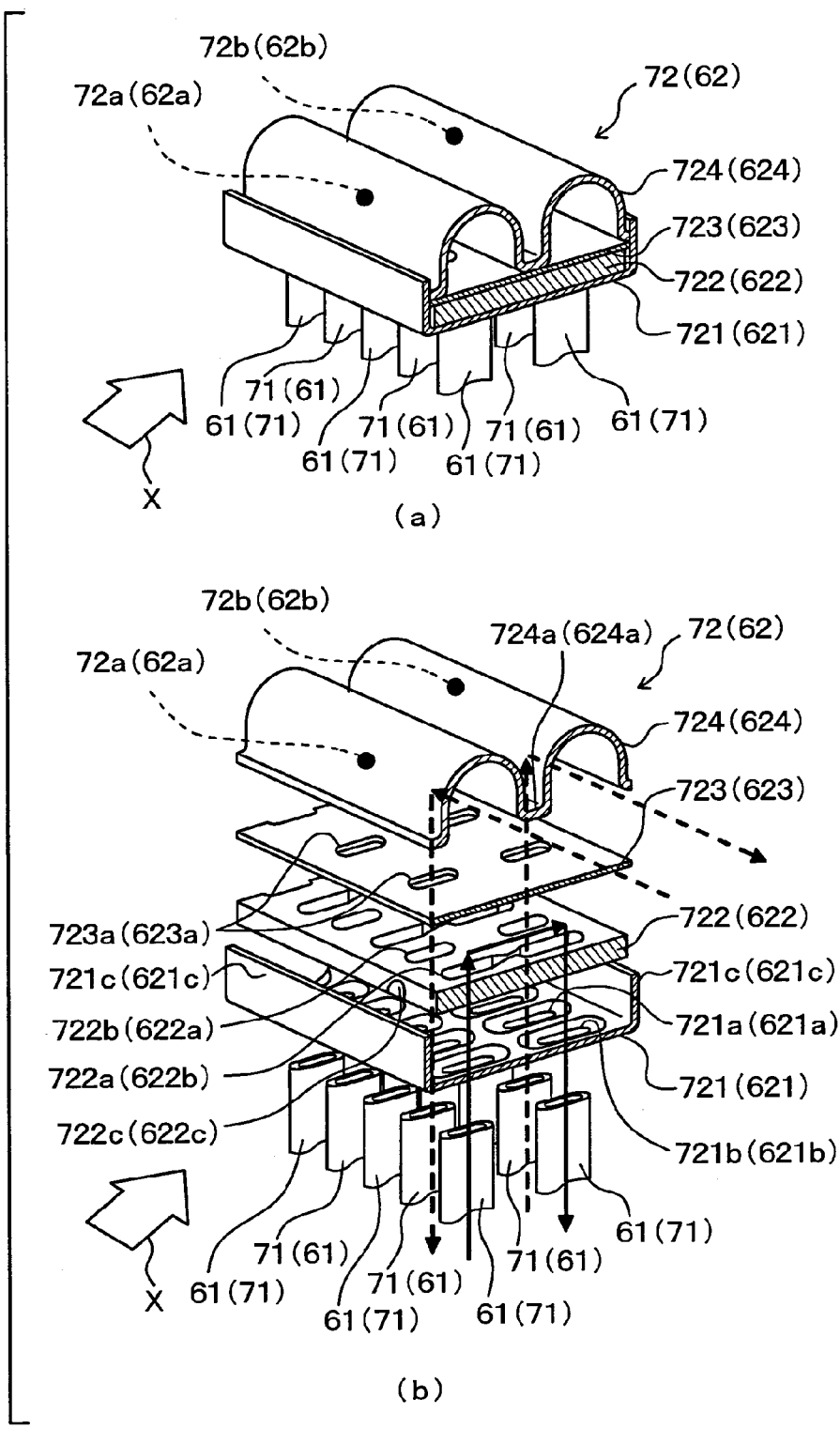
FIG. 6(a) is a partially cross-sectional view of a coolant side header tank of the heat exchanger according to the first embodiment.
FIG. 6(b) is an exploded view of the coolant side header tank of FIG. 6(a).
Figure 7:
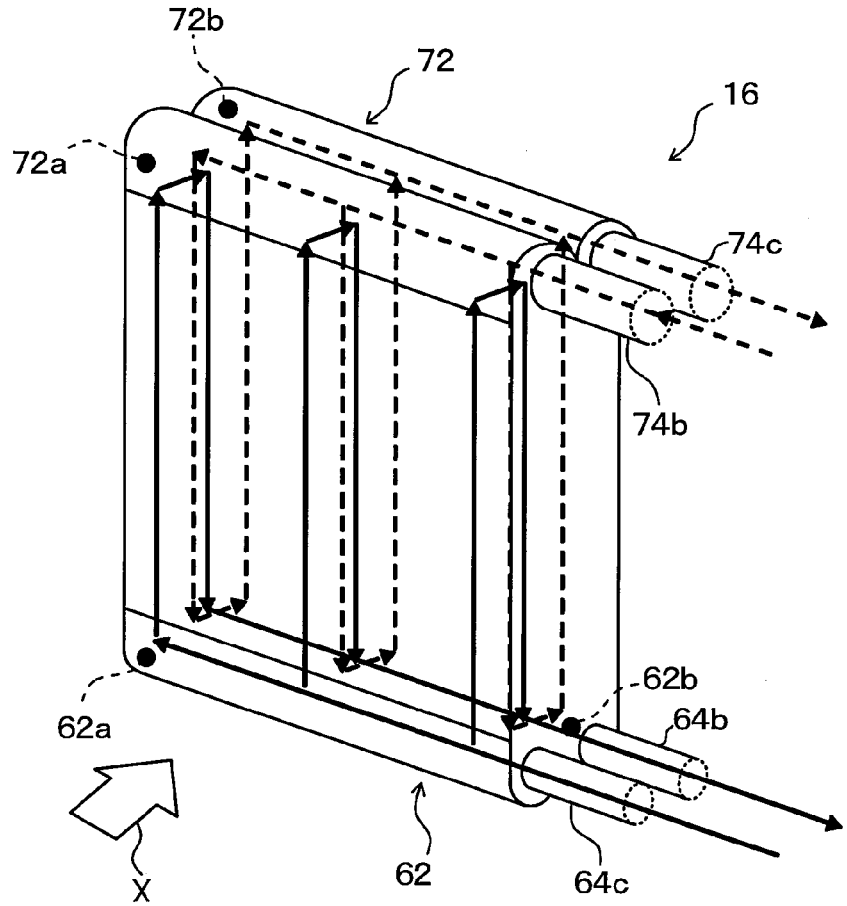
FIG. 7 is a schematic view illustrating a flow of a refrigerant and a coolant in the heat exchanger according to the first embodiment.
Figure 8:
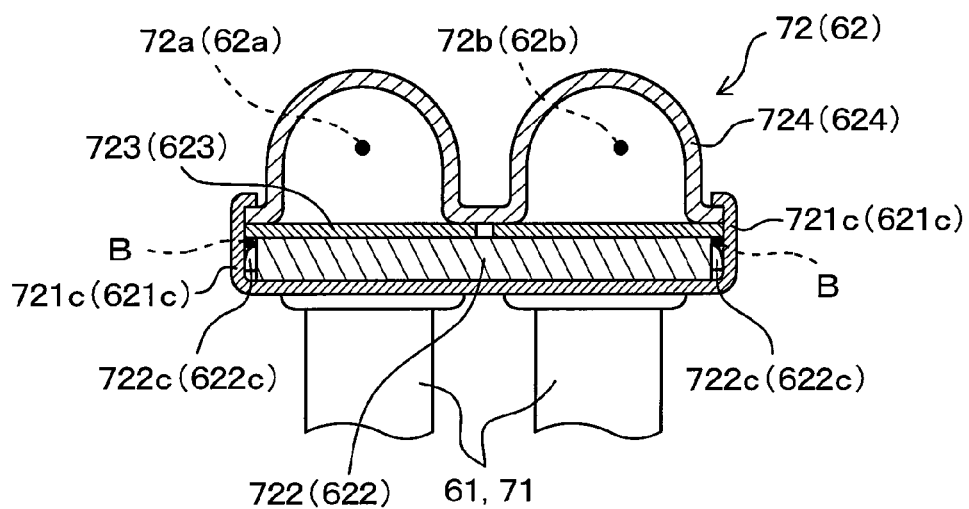
FIG. 8 is a cross-sectional view taken along a line A-A in FIG. 5.

Subsequently, a detailed configuration of the combined heat exchanger 16 according to the present embodiment will be described with reference to FIGS. 5 to 8. FIG. 5 is an external perspective view of the heat exchanger 16 according to the present embodiment. FIG. 6(*a*) is a partially cross-sectional view of a coolant side header tank 72 of the heat exchanger 16. FIG. 6(*b*) is an exploded perspective view of FIG. 6(*a*). FIG. 7 is a schematic view illustrating a refrigerant flow and a coolant flow in the heat exchanger 16. FIG. 8 is a cross-sectional view taken along a line A-A in FIG. 5.

First, as illustrated in FIG. 5, the vehicle exterior heat exchange unit 60 and the radiator unit 70 in the heat exchanger 16 are configured by a so-called tank and tube type heat exchanger structure having tubes 61 and 71 that allow the refrigerant or the coolant to flow therein, and header tanks 62 and 72, etc. that are arranged on end sides of the tubes in a longitudinal direction thereof, and collect or distribute the refrigerant or the coolant flowing in the respective tubes, respectively.

Specifically, the vehicle exterior heat exchange unit 60 is a heat exchange unit that includes the refrigerant tubes 61 in which the refrigerant flows as a first fluid, and the refrigerant side header tank 62 that extends in a stacked direction of the refrigerant tubes 61, and collects or distributes the refrigerant flowing in the refrigerant tubes 61, and exchanges the heat between the refrigerant flowing in the refrigerant tubes 61 and air (outside air blown from the air blowing fan 17) flowing around the refrigerant tubes 61 as a third fluid.

The radiator unit 70 is a heat exchange unit that includes the coolant tubes 71 in which the coolant flows as a second fluid, and the coolant side header tank 72 that extends in a stacked direction of the coolant tubes 71, and collects or distributes the coolant flowing in the coolant tubes 71, and exchanges the heat between the coolant flowing in the coolant tubes 71 and air (outside air blown from the air blowing fan 17) flowing around the coolant tubes 71.

In the heat exchanger 16 according to the present embodiment, flattened tubes flat in a cross-section perpendicular to the longitudinal direction are employed as the refrigerant tubes 61 and the coolant tubes 71. The refrigerant tubes 61 and the coolant tubes 71 are arranged in two rows along a flow direction X of the outside air, and the respective flattened surfaces are arranged in parallel to the flow direction X of the outside air blown by the air blowing fan 17.

Further, the refrigerant tubes 61 and the coolant tubes 71 arrayed on the windward side in the flow direction of the outside air are alternately stacked on each other at given intervals so that the respective flattened surfaces of outer surfaces are parallel to each other, and face each other. Likewise, the refrigerant tubes 61 and the coolant tubes 71 arrayed on the leeward side in the flow direction of the outside air are alternately stacked on each other at given intervals.

In other words, each of the refrigerant tubes 61 according to the present embodiment is arranged between the adjacent coolant tubes 71, and each of the coolant tubes 71 is arranged between the adjacent refrigerant tubes 61. Further, spaces formed between the refrigerant tubes 61 and the coolant tubes 71 are formed with outdoor air passages 16*a* (third fluid passage) in which the outside air blown by the air blowing fan 17 flows.

Also, outer fins 50 that facilitate the heat exchange between the refrigerant and the outside air in the vehicle exterior heat exchange unit 60 and the heat exchange between the coolant and the outside air in the radiator unit 70, and also enable heat transfer between the refrigerant flowing in the refrigerant tubes 61 and the coolant flowing in the coolant tubes 71 are arranged in the outdoor air passages 16*a*.

As the outer fins 50, corrugated fins obtained by bending a metal thin plate excellent in heat conductivity into a corrugated shape are employed. Further, in the present embodiment, the outer fins 50 are joined to both the refrigerant tubes 61 and the coolant tubes 71 to enable the heat transfer between the refrigerant flowing in the refrigerant tubes 61 and the coolant flowing in the coolant tubes 71.

Subsequently, the refrigerant side header tank 62 and the coolant side header tank 72 will be described with reference to FIG. 6. Since the basic configurations of the refrigerant side header tank 62 and the coolant side header tank 72 according to the present embodiment are identical with each other, FIG. 6 illustrates the coolant side header tank 72, and indicates symbols of the corresponding configurations in the refrigerant side header tank 62 are indicated in brackets. This is applied to FIG. 8 and other figures which will be described later. Also, in FIG. 6 and other figures, the outer fins 50 are omitted from the figures for clarification of the figures.

First, the coolant side header tank 72 includes a coolant side plate header member 721, a coolant side communication intermediate plate member 722, a coolant side blocking intermediate plate member 723, and a coolant side tank head member 724. The coolant side plate header member 721 is a plate member in which one end sides of the refrigerant tubes 61 and the coolant tubes 71 in the longitudinal direction thereof are connected to each other, which are arranged in two rows along the flow direction X of the outside air.

Specifically, the coolant side plate header member 721 is formed with refrigerant tube connection holes 721*a* and coolant tube connection holes 721*b* into which the refrigerant tubes 61 and the coolant tubes 71 are inserted and joined, respectively. The refrigerant tube connection holes 721*a* and the coolant tube connection holes 721*b* are formed to penetrate through both sides of plate surfaces of the coolant side plate header member 721 by burring.

Further, the refrigerant tube connection holes 721*a* and the coolant tube connection holes 721*b* are formed into respective flattened shapes (oval shapes) matching outer peripheral cross-sectional shapes of the refrigerant tubes 61 and the coolant tubes 71, and the outer peripheral surfaces of the refrigerant tubes 61 and the coolant tubes 71 are joined to the respective inner peripheral surfaces of the refrigerant tube connection holes 721*a* and the coolant tube connection holes 721*b*.

The coolant side communication intermediate plate member 722 is a plate member having one (lower side in FIG. 6) plate surface joined to the plate surface of the coolant side plate header member 721, in which first fluid communication holes 722a and second fluid communication holes 722b which are communicated with the refrigerant (first fluid) and the coolant (second fluid), respectively, are formed. Those first and second fluid communication holes 722a and 722b are formed to penetrate through both sides of the plate surface of the coolant side communication intermediate plate member 722, and each formed into a slot shape extending along the flow direction X of the outside air.

More specifically, the first fluid communication holes 722a formed in the coolant side communication intermediate plate member 722 are each formed into a slot shape extending along the flow direction X of the outside air so as to be communicated with both the refrigerant tube 61 on an upstream side and the refrigerant tube 61 on a downstream side in the flow direction X of the outside air. Also, the second fluid communication holes 722b are formed to be communicated with one of the coolant tube 71 on the upstream side or the coolant tube 71 on the downstream side in the flow direction X of the outside air, and arranged in two rows in the flow direction X of the outside air.

The coolant side blocking intermediate plate member 723 is a plate member having a plate surface joined to the other plate surface (a surface opposite to a surface joined to the coolant side plate header member 721) of the coolant side communication intermediate plate member 722, and blocking the first and second fluid communication holes 722a formed in the coolant side communication intermediate plate member 722. Further, the coolant side blocking intermediate plate member 723 is formed with communication holes 723a formed to penetrate through both sides of the plate surface of the coolant side blocking intermediate plate member 723.

Specifically, the coolant side blocking intermediate plate member 723 according to the present embodiment blocks the above-mentioned first fluid communication holes 722a when being joined to the coolant side communication intermediate plate member 722. As a result, the respective refrigerant tubes 61 adjacently arranged as a pair, specifically, the refrigerant tube 61 on the upstream side in the flow direction X of the outside air, and the refrigerant tube 61 on the downstream side are communicated with each other. In detail, the refrigerant tube 61 on the upstream side in the flow direction X of the outside air, and the refrigerant tube 61 on the downstream side, which are communicated to the same first fluid communication holes 722a, are communicated with each other. However, those refrigerant tubes 61 are not communicated to the coolant distribution space 72a and the coolant collection space 72b formed within the coolant side tank head member 724. The coolant distribution space 72a and the coolant collection space 72b may exemplify the internal space formed within the coolant side tank head member 724.

Specifically, the communication holes 723a of the coolant side blocking intermediate plate member 723 are formed to overlap with the second fluid communication holes 722b when the coolant side blocking intermediate plate member 723 is joined to the coolant side communication intermediate plate member 722. With this configuration, since the second fluid communication holes 722b is not closed, the coolant tubes 71 communicate with a coolant distribution space 72a and a coolant collection space 72b which are internal spaces of the coolant side header tank 72, through the second fluid communication holes 722b and the communication holes 723a.

As described above, the first fluid communication holes 722a of the coolant side communication intermediate plate member 722 form the refrigerant passages that communicate the refrigerant tube 61 on the upstream side with the refrigerant tube 61 on the downstream side in the flow direction X of the outside air. Under the circumstances, in the present embodiment, in order to suppress the pressure loss when the refrigerant passes through the refrigerant passage, a thickness dimension perpendicular to the plate surface of the coolant side communication intermediate plate member 722 is set to be larger than a thickness dimension of the coolant side plate header member 721 or the coolant side blocking intermediate plate member 723 to ensure a passage cross-section of the refrigerant passage.

The coolant side tank head member 724 is joined to the coolant side blocking intermediate plate member 723 to form the coolant distribution space 72a for distribution of the coolant and the coolant collection space 72b for collection of the coolant therein. Specifically, the coolant side tank head member 724 is formed into a two-peak shape (W-shape) when viewed from the longitudinal direction, by subjecting a plate metal to press work.

Then, a center portion 724a of the two-peak shape of the coolant side tank head member 724 is joined to the coolant side blocking intermediate plate member 723, to thereby compartment the coolant distribution space 72a and the coolant collection space 72b. Specifically, in the present embodiment, as illustrated in FIG. 7, the coolant distribution space 72a is arranged on the upstream side in the flow direction X of the outside air, and the coolant collection space 72b is arranged on the downstream side in the flow direction X of the outside air.

Also, as illustrated in FIG. 5, one end side of the coolant side header tank 72 in the longitudinal direction is connected with a coolant inflow pipe 74b for allowing the coolant to flow into the coolant distribution space 72a, and also connected with a coolant outflow pipe 74c for allowing the coolant to flow out of the coolant collection space 72b. Further, the other end side of the coolant side header tank 72 is blocked by a blocking member.

Subsequently, the refrigerant side header tank 62 includes a refrigerant side plate header member 621, a refrigerant side communication intermediate plate member 622, a refrigerant side blocking intermediate plate member 623, and a refrigerant side tank header member 624. Refrigerant tube connection holes 621a and coolant tube connection holes 621b of the refrigerant side plate header member 621 are connected to the other ends of the refrigerant tubes 61 and the coolant tubes 71 in the longitudinal direction, respectively.

Also, first fluid communication holes 622a formed in the refrigerant side communication intermediate plate member 622 are formed to be communicated with one of the refrigerant tubes 61 on the upstream side and the refrigerant tubes 61 on the downstream side in the flow direction X of the outside air, and arranged in two rows in the flow direction X of the outside air. Further, second fluid communication holes 622b formed in the refrigerant side communication intermediate plate member 622 are formed to be communicated with both the coolant tubes 71 on the upstream side and the coolant tubes 71 on the downstream side in the flow direction X of the outside air.

The refrigerant side blocking intermediate plate member 623 is a plate member that blocks the second fluid communication holes 622b formed in the refrigerant side communication intermediate plate member 622. The coolant side blocking intermediate plate member 723 is formed with communication holes 623a for communicating the refrigerant tubes 61 with a refrigerant distribution space 62a and a refrigerant collection space 62b which are formed within the refrigerant side tank header member 624. The refrigerant distribution space 62a and the refrigerant collection space 62b may exemplify the internal spaces formed within the refrigerant side tank header member 624.

The refrigerant side tank header member 624 is joined to the refrigerant side blocking intermediate plate member 623 to form the refrigerant distribution space 62a for distributing the refrigerant and the refrigerant collection space 62b for collecting the refrigerant therein. In the present embodiment, the refrigerant distribution space 62a is arranged on the upstream side in the flow direction X of the outside air, and the refrigerant collection space 62b is arranged on the downstream side in the flow direction X of the outside air.

Also, as illustrated in FIG. 5, one end side of the refrigerant side header tank 62 in the longitudinal direction is connected with a refrigerant inflow pipe 64c that allows the refrigerant to flow into the refrigerant distribution space 62a, and a refrigerant outflow pipe 64b that allows the refrigerant to flow out of the refrigerant collection space 62b. Further, the other end side of the refrigerant side header tank 62 in the longitudinal direction is blocked by a blocking member as with the coolant side header tank 72 refrigerant side.

Therefore, in the heat exchanger 16, as indicated by thick dashed lines in the schematic perspective views of FIGS. 6(b) and 7, the coolant that has flowed into the coolant distribution space 72a of the coolant side header tank 72 through the coolant inflow pipe 74b flows into the coolant tubes 71 arranged on upstream side in the flow direction X of the outside air among the coolant tubes 71 arranged in two rows.

The coolant that has flowed from the coolant tubes 71 arranged on upstream side in the flow direction X of the outside air flow flows into the coolant tubes 71 arranged on the downstream side in the flow direction X of the outside air through the second fluid communication holes 622b formed in the refrigerant side communication intermediate plate member 622. In this situation, since the second fluid communication holes 622b are blocked by the refrigerant side blocking intermediate plate member 623, the coolant does not flow into the refrigerant distribution space 62a and the refrigerant collection space 62b within the refrigerant side header tank 62 or to the external from the second fluid communication holes.

Then, the coolant flowing out of the coolant tubes 71 arranged on the downstream side in the flow direction X of the outside air is collected into the coolant collection space 72b of the coolant side header tank 72, and flows out through the coolant outflow pipe 74c. That is, in the heat exchanger 16 according to the present embodiment, the coolant flows while U-turning in the following order: the coolant tubes 71 arranged on the upstream side in the flow direction X of the outside air; the second fluid communication holes 622b within the refrigerant side header tank 62; and the coolant tubes 71 arranged on the downstream side in the flow direction X of the outside air.

On the other hand, as indicated by thick solid lines in the schematic perspective views of FIGS. 6(b) and 7, the refrigerant flows while U-turning in the following order: the refrigerant tubes 61 arranged on the upstream side in the flow direction X of the outside air; the first fluid communication holes 722a within the coolant side header tank 72; and the refrigerant tubes 61 arranged on the downstream side in the flow direction X of the outside air. Therefore, the refrigerant flowing in the adjacent refrigerant tubes 61, and the coolant flowing in the adjacent coolant tubes 71 become flows (parallel flows) flowing parallel to the flow direction X of the outside air from the macroscopic viewpoint.

Also, the respective constituent members 621 to 624, 721 to 724 of the refrigerant side header tank 62 and the coolant side header tank 72 described above, and the outer fins 50 are all made of the same metal material (aluminum alloy in the present embodiment) as that of the refrigerant tubes 61 and the coolant tubes 71.

Subsequently, a method of manufacturing the heat exchanger 16 will be described with reference to FIG. 8. First, in manufacturing the heat exchanger 16 according to the present embodiment, the respective constituent members of the refrigerant side header tank 62 and the coolant side header tank 72 are provisionally fixed (provisional tank fixing process).

Specifically, in the coolant side header tank 72, as illustrated in FIG. 8, a plate surface of the coolant side communication intermediate plate member 722 on a lower side in a paper plane is put on a plate surface of the coolant side plate header member 721 on an upper side in the paper plane. A plate surface of the coolant side blocking intermediate plate member 723 on the lower side in the paper plane is put on a plate surface of the coolant side communication intermediate plate member 722 on the upper side in the paper plane. Further, the coolant side tank head member 724 is arranged on a plate surface of the coolant side blocking intermediate plate member 723 on the upper side in the paper plane.

In this state, claw portions 721c formed on both ends of the coolant side plate header member 721 in the width direction (the same as the flow direction X of the outside air) are bent toward the coolant side tank head member 724, to thereby provisionally fix the coolant side plate header member 721, the coolant side communication intermediate plate member 722, the coolant side blocking intermediate plate member 723, and the coolant side tank head member 724.

In this example, positioning portions 722c locally protruding toward the width direction are formed on both ends of the coolant side communication intermediate plate member 722 in the width direction. The positioning portions 722c are abutted against the claw portions 721c of the coolant side plate header member 721, to thereby position the coolant side communication intermediate plate member 722 relative to the coolant side plate header member 721.

Both ends of the coolant side blocking intermediate plate member 723 and the coolant side tank head member 724 in the width direction are abutted against the claw portions 721c so as to be positioned with respect to the coolant side plate header member 721. Therefore, as illustrated in FIG. 8, external spaces B that are communicated with the outside air are formed in regions where the positioning portions 722c are not present between both sides of the coolant side communication intermediate plate member 722 in the width direction, and the inside of the coolant side plate header member 721.

As with the coolant side header tank 72, in the refrigerant side header tank 62, claw portions 621c formed on both ends of the refrigerant side plate header member 621 in the width direction (the same as the flow direction X of the outside air) are bent toward the refrigerant side tank header member 624, to thereby provisionally fix the refrigerant side plate header member 621, the refrigerant side communication intermediate plate member 622, the refrigerant side blocking intermediate plate member 623, and the refrigerant side tank header member 624.

Positioning portions 622c locally protruding toward the width direction are formed on both ends of the refrigerant side communication intermediate plate member 622 in the width direction. The positioning portions 622c are abutted against the claw portions 621c of the refrigerant side plate header member 621, to thereby position the refrigerant side communication intermediate plate member 622 relative to the refrigerant side plate header member 621.

Subsequently, the refrigerant tubes 61 and the coolant tubes 71 are inserted, respectively, into the refrigerant tube connection holes 621a, 721a and the coolant tube connection holes 621b, 721b of the refrigerant side header tank 62 (refrigerant side plate header member 621) and the coolant side header tank 72 (coolant side plate header member 721) which have been provisionally fixed, and then provisionally fixed (provisional tube fixing process).

In the provisional tube fixing process, it is preferable that leading ends of the refrigerant tubes 61 are inserted into the interiors of the first fluid communication holes 622a and 722a formed in the refrigerant side communication intermediate plate member 622 and the coolant side communication intermediate plate member 722 until being positioned therein. Also, it is preferable that leading ends of the coolant tubes 71 are inserted into the interiors of the second fluid communication holes 622b and 722b formed in the refrigerant side communication intermediate plate member 622 and the coolant side communication intermediate plate member 722 until being positioned therein.

With the above process, in the heat exchanger joining process which will be described later, the refrigerant tubes 61 and the coolant tubes 71 can be tightly joined to the refrigerant side header tank 62 and the coolant side header tank 72, respectively. Further, the outer fins 50 are fitted into the outdoor air passages 16a formed between the refrigerant tubes 61 and the coolant tubes 71, and provisionally fixed thereto, and the respective inflow/outflow pipes 64b, 64c, 74b, and 74c, etc. are provisionally fixed (provisional heat exchanger fixing process).

Then, after the provisionally fitted heat exchanger 16 has been fixed by a wire jig, etc., the overall heat exchanger 16 is put into a heating furnace, and heated. A brazing filer metal cladded on the respective component surfaces in advance is melted, and cooled until the brazing filter metal is again coagulated, to thereby join the respective components by brazing integrally (heat exchanger joining process). With this process, the heat exchanger 16 having the vehicle exterior heat exchange unit 60 and the radiator unit 70 integrated together is manufactured.

That is, in the present embodiment, in the coolant side header tank 72, the plate surface of the coolant side plate header member 721 and one plate surface of the coolant side communication intermediate plate member 722, as well as the other plate surface of the coolant side communication intermediate plate member 722 and the plate surface of the coolant side blocking intermediate plate member 723 are joined to each other by brazing, to thereby suppress the mixture of the refrigerant flowing in the first fluid communication holes 722a formed in the coolant side communication intermediate plate member 722 with the coolant flowing in the second fluid communication holes 722b.

Likewise, in the refrigerant side header tank 62, the plate surface of the refrigerant side plate header member 621 and one plate surface of the refrigerant side communication intermediate plate member 622, as well as the other plate surface of the refrigerant side communication intermediate plate member 622 and the plate surface of the refrigerant side blocking intermediate plate member 623 are joined to each other by brazing, to thereby suppress the mixture of the refrigerant flowing in the first fluid communication holes 622a formed in the refrigerant side communication intermediate plate member 622 with the coolant flowing in the second fluid communication holes 622b.

As is apparent from the above description, the vehicle exterior heat exchange unit 60 according to the present embodiment may correspond to a first heat exchange unit, the refrigerant tubes 61 may correspond to a first tube, and the refrigerant side header tank 62 may correspond to a second tank. Also, the radiator unit 70 may correspond to the second heat exchange unit, the coolant tubes 71 may correspond to the second tubes, and the coolant side header tank 72 may correspond to the second tank.

Subsequently, an electric control unit according to the present embodiment will be described. The air conditioning control device includes a known microcomputer having a CPU, a ROM, and a RAM, and peripheral circuits thereof, conducts various calculations and processing on the basis of an air conditioning control program stored in the ROM, and controls the actuation of the various air conditioning control equipments 11, 15a, 15b, 17, 41, and 42, etc. connected to an output side.

Also, an input side of the air conditioning control device is connected with a sensor group for various air conditioning controls such as an inside air sensor for detecting an vehicle interior temperature, an outside air sensor for detecting an outside air temperature, an insolation sensor for detecting the amount of insolation within the vehicle interior, an evaporator temperature sensor for detecting a blowing air temperature (evaporator temperature) of the vehicle interior evaporator 20, a blow refrigerant temperature sensor for detecting a blow refrigerant temperature of the compressor 11, an outlet refrigerant temperature sensor 51 for detecting an outlet side refrigerant temperature Te of the vehicle exterior heat exchange unit 60, and a coolant temperature sensor 52 as a coolant temperature detecting device for detecting a coolant temperature Tw flowing into the travel electric motor MG.

In the present embodiment, the coolant temperature Tw pumped from the coolant pump 41 is detected by the coolant temperature sensor 52. Alternatively, the coolant temperature Tw sucked into the coolant pump 41 may be detected by the coolant temperature sensor 52.

Further, the input side of the air conditioning control device is connected with an operating panel not shown which is arranged in the vicinity of an instrument panel in a front portion of the vehicle interior, and receives operation signals from various air conditioning operation switches disposed in the instrument panel. As the various air conditioning operation switches disposed in the operating panel, there are provided an operation switch of the vehicle air conditioner, a vehicle interior temperature setting switch for setting the vehicle interior temperature, and a select switch for operation modes.

Also, the air conditioning control device is integrated with the control device for controlling the electric motor 11b of the compressor 11, and the on-off valve 15a, etc., and controls the operation thereof. In the present embodiment, in the air conditioning control device, a configuration (hardware and software) that controls the actuation of the compressor 11 configures a refrigerant blow capability control device, a configuration that controls the actuations of the various devices 15a and 15b configuring the refrigerant passage switching device configures a refrigerant passage control device, and a configuration that controls the actuation of the three-way valve 42 configuring the circuit switching device for the coolant configures a refrigerant medium circuit control device.

Further, the air conditioning control device according to the present embodiment has a configuration (frost formation determining device) for determining whether frost is formed in the vehicle exterior heat exchange unit 60, or not, on the basis of detection signals of the sensor group for the air conditioning control described above. Specifically, in the frost formation determining device, when a velocity of the vehicle is equal to or lower than a predetermined reference vehicle velocity (20 km/h in the present embodiment), and the outlet side refrigerant temperature Te of the vehicle exterior heat exchange unit 60 is equal to or lower than 0° C., it is determined that the frost is formed in the vehicle exterior heat exchange unit 60.

Subsequently, the actuation of the vehicle air conditioner 1 according to the present embodiment in the above configuration will be described. The vehicle air conditioner 1 according to the present embodiment can execute the heating operation for heating the vehicle interior, and the cooling operation for cooling the vehicle interior, and can also execute the defrosting operation and the waste heat recovery operation during the heating operation. Hereinafter, the actuation in the respective operation will be described.

(a) Heating Operation

The heating operation starts when the heating operation mode is selected by the select switch in a state where the actuation switch of the operating panel is on. Then, in the heating operation, if it is determined by the frost formation determining device that the frost is formed in the vehicle exterior heat exchange unit 60, the defrosting operation is executed. If the coolant temperature Tw detected by the coolant temperature sensor 52 becomes equal to or higher than a predetermined reference temperature (60° C. in the present embodiment), the waste heat recovery operation is executed.

First, in the normal heating operation, the air conditioning control device closes the on-off valve 15a, and switches the three-way valve 15b to the refrigerant passage that connects the outlet side of the vehicle exterior heat exchange unit 60 and the inlet side of the accumulator 18. Further, the air conditioning control device actuates the coolant pump 41 so as to pump a predetermined given flow rate of coolant, and also switches the three-way valve 42 of the coolant circulation circuit 40 to the cooling medium circuit that allows the coolant to flow while bypassing the radiator unit 70.

With the above configuration, the heat pump cycle 10 is switched to the refrigerant passage in which the refrigerant flows as indicated by the solid arrows in FIG. 1, and the coolant circulation circuit 40 is switched to the cooling medium circuit in which the coolant flows as indicated by dashed arrows in FIG. 1.

With the above configuration of the refrigerant passage and the cooling medium circuit, the air conditioning control device reads the detection signals of the sensor group for the air conditioning control, and the operation signals of the operation panel described above. Then, the air conditioning control device calculates a target blowing temperature TAO which is a target temperature of the air blown into the vehicle interior on the basis of values of the detection signals and the operation signals. Further, the air conditioning control device determines the actuation states of the various air conditioning control equipments connected to the output side of the air conditioning control device on the basis of the calculated target blowing temperature TAO and the detection signals of the sensor group.

For example, the refrigerant discharge capability of the compressor 11, that is, the control signal output to the electric motor of the compressor 11 is determined as follows. First, a target evaporator blowing temperature TEO of the vehicle interior evaporator 20 is determined with reference to a control map stored in the air conditioning control device in advance, on the basis of the target blowing temperature TAO.

Then, the control signal output to the electric motor in the compressor 11 is determined so that the blowing air temperature from the vehicle interior evaporator 20 approaches the target evaporator blowing temperature TEO with the use of a feedback control technique, on the basis of a deviation between the target evaporator blowing temperature TEO and the blowing air temperature from the vehicle interior evaporator 20 which is detected by the evaporator temperature sensor.

Also, the control signal output to a servo motor of the air mix door 34 is determined so that the temperature of air blown into the vehicle interior reaches a temperature desired by a passenger which is set by the vehicle interior temperature setting switch, with the use of the target blowing temperature TAO, the blowing air temperature from the vehicle interior evaporator 20, and the compressor 11 discharge refrigerant temperature detected by the discharge refrigerant temperature sensor, etc.

In the normal heating operation, the defrosting operation, and the waste heat recovery operation, the opening degree of the air mix door 34 may be controlled so that a total air volume of the vehicle interior blowing air blown from the blower 32 passes through the vehicle interior condenser 12.

Then, the control signal determined as described above is output to the various air conditioning control equipments. Thereafter, a control routine of reading the above-mentioned detection signals and operation signals, calculating the target blowing temperature TAO, determining the actuation state of the various air conditioning control equipments, and outputting the control voltage and the control signal in stated order is repeated every given control cycle until an actuation stop of the vehicle air conditioner is required by the operation panel. The repetition of this control routine is also basically conducted in other operation.

In the heat pump cycle 10 during the normal heating operation, a high pressure refrigerant discharged from the compressor 11 flows into the vehicle interior condenser 12. The refrigerant that has flowed into the vehicle interior condenser 12 is blown from the blower 32 conducts the heat exchange with the vehicle interior blowing air that has been blown from the blower 32, and passed through the vehicle interior evaporator 20, to radiate the heat. With this operation, the vehicle interior blowing air is heated.

Since the on-off valve 15a is closed, the high pressure refrigerant flowing from the vehicle interior condenser 12 flows into the heating fixed aperture 13, and is decompressed and expanded. Then, the low pressure refrigerant decompressed and expanded by the heating fixed aperture 13 flows into the vehicle exterior heat exchange unit 60. The low pressure refrigerant that has flowed into the vehicle exterior heat exchange unit 60 is heat-absorbed from the outside air blown by the air blowing fan 17, and evaporated.

In this situation, since the coolant circulation circuit 40 is switched to the cooling medium circuit in which the coolant flows while bypassing the radiator unit 70, there is no case in which the coolant is radiated to the refrigerant flowing in the vehicle exterior heat exchange unit 60, or the coolant absorbs heat from the refrigerant flowing in the vehicle exterior heat exchange unit 60. That is, the coolant does not thermally affect the refrigerant flowing in the vehicle exterior heat exchange unit 60.

The refrigerant flowing out of the vehicle exterior heat exchange unit 60 flows into the accumulator 18, and is separated into vapor and liquid since the three-way valve 15b is switched to the refrigerant passage that connects the outlet side of the vehicle exterior heat exchange unit 60 and the input side of the accumulator 18. Then, a gas phase refrigerant separated by the accumulator 18 is sucked into the compressor 11, and again compressed.

As described above, in the normal heating operation, the vehicle interior blowing air is heated by the heat quantity of the refrigerant discharged from the compressor 11 through the vehicle interior condenser 12 so that the vehicle interior can be heated.

(b) Defrosting Operation

Subsequently, the defrosting operation will be described. As in the heat pump cycle 10 according to the present embodiment, in the refrigeration cycle device where the heat exchange is conducted between the refrigerant and the outside air to evaporate the refrigerant by the vehicle exterior heat exchange unit 60, frost could be formed in the vehicle exterior heat exchange unit 60 if a refrigerant evaporation temperature in the vehicle exterior heat exchange unit 60 becomes equal to or lower than the frost formation temperature (specifically 0° C.).

When the frost is thus formed, since an outdoor air passages 16a of the heat exchanger 16 is blocked by frost, the heat exchange capability of the vehicle exterior heat exchange unit 60 could be remarkably degraded. Under the circumstances, in the heat pump cycle 10 according to the present embodiment, in the heating operation, the defrosting operation is executed when it is determined by the frost formation determining device that the frost is formed in the vehicle exterior heat exchange unit 60.

In the defrosting operation, the air conditioning control device stops the actuation of the compressor 11, and also stops the actuation of the air blowing fan 17. Therefore, in the defrosting operation, the refrigerant flow rate flowing in the vehicle exterior heat exchange unit 60 is reduced, and the air volume of the outside air flowing into the outdoor air passages 16a is reduced as compared with the normal heating operation.

Further, the air conditioning control device switches the three-way valve 42 of the coolant circulation circuit 40 to the refrigerant medium circuit that allows the coolant to flow into the radiator unit 70 as indicated by dashed arrows in FIG. 2. As a result, the refrigerant is not circulated in the heat pump cycle 10, and the coolant circulation circuit 40 is switched to the refrigerant medium circuit in which the refrigerant flows as indicated by dashed arrows in FIG. 2.

Therefore, the heat quantity of the coolant flowing in the coolant tubes 71 of the radiator unit 70 is transferred to the vehicle exterior heat exchange unit 60 through the outer fins 50, to defrost the vehicle exterior heat exchange unit 60. That is, the refrigerant flowing in the heat exchanger 16 and the flow quantity of the outside air are changed (specifically, decreased), to thereby realize defrost effectively using heat exhaust of the travel electric motor MG.

(c) Waste Heat Recovery Operation

Subsequently, the waste heat recovery operation will be described. In order to suppress overheat of the travel electric motor MG, it is preferable to maintain the temperature of the coolant at a given upper limit temperature or lower. On the other hand, in order to reduce a friction loss caused by an increase in viscosity of a lubricating oil sealed within the travel electric motor MG, it is preferable to maintain the temperature of the coolant at a given lower limit temperature or higher.

Under the circumstances, in the heat pump cycle 10 according to the present embodiment, in the heating operation, the waste heat recovery operation is executed when the coolant temperature Tw becomes a predetermined reference temperature (60° C. in the present embodiment) or higher. In this waste heat recovery operation, the three-way valve 15b of the heat pump cycle 10 is actuated in the same manner as the normal heating operation, and the three-way valve 42 of the coolant circulation circuit 40 is switched to the cooling medium circuit that allows the coolant to flow into the radiator unit 70 as indicated by dashed arrows in FIG. 3 in the same manner as the defrosting operation.

Figure 3:
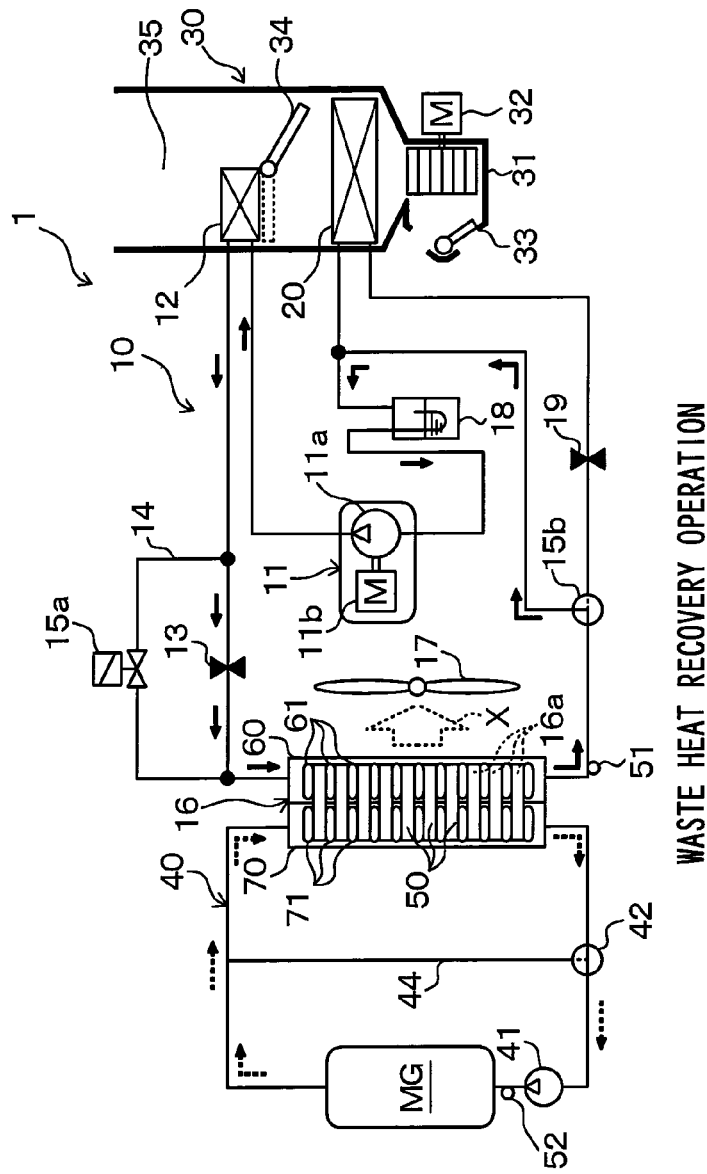
FIG. 3 is a schematic view illustrating waste heat recovery operation of the vehicle air conditioner including the heat exchanger according to the first embodiment.

Therefore, as indicated by the solid arrows in FIG. 3, the high pressure and temperature refrigerant discharged from the compressor 11 heats the vehicle interior blowing air by the vehicle interior condenser 12, is decompressed and expanded by the heating fixed aperture 13, and flows into the vehicle exterior heat exchange unit 60 as in the same manner as the normal heating operation.

Since the low pressure refrigerant that has flowed into the vehicle exterior heat exchange unit 60 absorbs both the heat quantity of the outside air blown by the air blowing fan 17 and the heat quantity of the coolant heat-transferred through the outer fins 50, and is evaporate since the three-way valve 42 is switched to the cooling medium circuit that allows the coolant to flow into the radiator unit 70. The other actuation is identical with that in the normal heating operation.

As described above, in the waste heat recovery operation, the vehicle interior blowing air is heated by the heat quantity of the refrigerant discharged from the compressor 11 through the vehicle interior condenser 12 so that the vehicle interior can be heated. In this situation, the refrigerant absorbs not only the heat quantity of the outside air but also the heat quantity of the coolant heat-transferred through the outer fins 50. Therefore, the heating of the vehicle interior can be realized by effectively using the waste heat of the travel electric motor MG.

(d) Cooling Operation

The cooling operation starts when a cooling operation mode is selected by the select switch in a state where the actuation switch of the operation panel is on. In the cooling operation, the air conditioning control device opens the on-off valve 15a, and switches the three-way valve 15b to the refrigerant passage that connects the outlet side of the vehicle exterior heat exchange unit 60 and the inlet side of the cooling fixed aperture 19. As a result, the heat pump cycle 10 is switched to the refrigerant passage in which the refrigerant flows as indicated by the solid arrows in FIG. 4.

Figure 4:
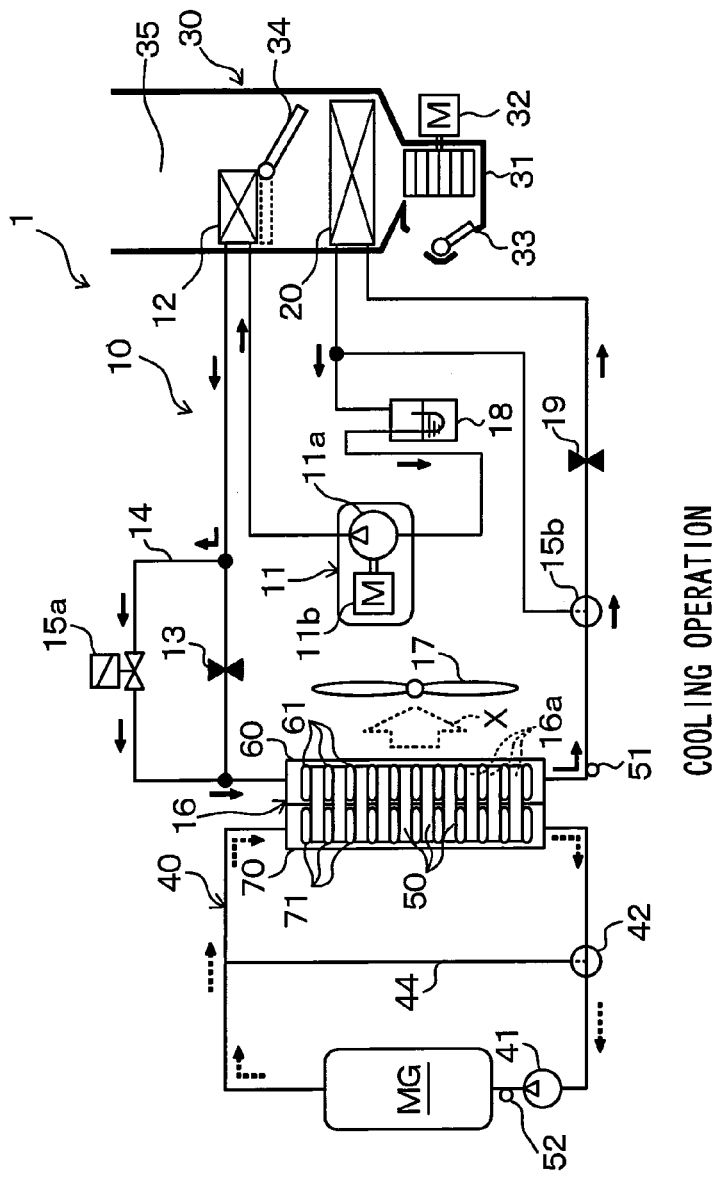
FIG. 4 is a schematic view illustrating cooling operation of the vehicle air conditioner including the heat exchanger according to the first embodiment.

In this situation, the three-way valve 42 of the coolant circulation circuit 40 is switched to the cooling medium circuit that allows the coolant to flow into the radiator unit 70 when the coolant temperature Tw becomes equal to or higher than the reference temperature, and switched to the cooling medium circuit in which the coolant flows while bypassing the radiator unit 70 when the coolant temperature Tw becomes lower than the predetermined reference temperature. In FIG. 4, a flow of the coolant when the coolant temperature Tw becomes equal to or higher than the reference temperature is indicated by the dashed arrows.

In the heat pump cycle 10 during the cooling operation, the high pressure refrigerant discharged from the compressor 11 flows into the vehicle interior condenser 12, and conducts the heat exchange with the vehicle interior blowing air that has been blown from the blower 32 and passed through the vehicle interior evaporator 20 to radiate the heat. Since the on-off valve 15a is opened, the high pressure refrigerant flowing out of the vehicle interior condenser 12 flows into the vehicle exterior heat exchange unit 60 through the fixed aperture bypass passage 14. The high pressure refrigerant that has flowed into the vehicle exterior heat exchange unit 60 further radiates the heat to the outside air blown by the air blowing fan 17.

Since the three-way valve 15b is switched to the refrigerant passage that connects the outlet side of the vehicle exterior heat exchange unit 60 and the inlet side of the cooling fixed aperture 19, the refrigerant flowing out of the vehicle exterior heat exchange unit 60 is decompressed and expanded by the cooling fixed aperture 19. The refrigerant flowing out of the cooling fixed aperture 19 flows into the vehicle interior evaporator 20, absorbs heat from the vehicle interior blowing air blown by the blower 32, and is evaporated. As a result, the vehicle interior blowing air is cooled.

The refrigerant flowing from the vehicle interior evaporator 20 flows into the accumulator 18, and is separated into gas and liquid. Then, a gas phase refrigerant separated by the accumulator 18 is sucked into the compressor 11, and again compressed. As described above, in the cooling operation, the low pressure refrigerant absorbs the heat from the vehicle interior blowing air, and is evaporated by the vehicle interior evaporator 20 so that the vehicle interior blowing air can be cooled to cool the vehicle interior.

In the vehicle air conditioner 1 according to the present embodiment, as described above, various operation can be executed by switching between the refrigerant passage of the heat pump cycle 10 and the cooling medium circuit of the coolant circulation circuit 40. Further, in the present embodiment, since the above-mentioned characteristic heat exchanger 16 is applied, an appropriate heat exchange can be conducted among three types of fluids including the refrigerant, the coolant, and the outside air in the respective operation.

In more detail, in the heat exchanger 16 according to the present embodiment, the outer fins 50 are arranged in the outdoor air passages 16a formed between the refrigerant tubes 61 of the vehicle exterior heat exchange unit 60 and the coolant tubes 71 of the radiator unit 70. Then, the heat transfer between the refrigerant tubes 61 and the coolant tubes 71 can be performed by the outer fins 50.

With the above configuration, in the defrosting operation, since the heat quantity of the coolant can be transferred to the vehicle exterior heat exchange unit 60 through the outer fins 50, the waste heat of the travel electric motor MG can be effectively used for the purpose of defrosting the vehicle exterior heat exchange unit 60.

Further, in the present embodiment, in the defrosting operation, the actuation of the compressor 11 stops to reduce the refrigerant flow rate flowing into the vehicle exterior heat exchange unit 60. Therefore, the heat quantity to be transferred to the vehicle exterior heat exchange unit 60 through the outer fins 50 and the refrigerant tubes 61 can be prevented from being absorbed by the refrigerant flowing in the refrigerant tubes 61. That is, unnecessary heat exchange between the coolant and the refrigerant can be suppressed.

Further, in the defrosting operation, since the actuation of the air blowing fan 17 stops to reduce the air volume of the outside air flowing into the outdoor air passages 16a, the heat quantity to be transferred to the vehicle exterior heat exchange unit 60 through the outer fins 50 can be prevented from being absorbed by the outside air flowing in the outdoor air passages 16a. That is, the unnecessary heat exchange between the coolant and the outside air can be suppressed.

Also, in the waste heat recovery operation, the heat exchange is conducted between the coolant and the refrigerant through the refrigerant tubes 61, the coolant tubes 71, and the outer fins 50 so that the waste heat of the travel electric motor MG can be absorbed by the refrigerant. Also, the heat exchange is conducted between the coolant and the outside air through the coolant tubes 71 and the outer fins 50 so that the unnecessary waste heat of the travel electric motor MG can be radiated to the outside air.

Also, in the normal heating operation, the heat exchange is conducted between the refrigerant and the outside air through the refrigerant tubes 61 and the outer fins 50 so that the heat quantity of the outside air can be absorbed by the refrigerant.

Further, in the normal heating operation, the three-way valve 42 of the coolant circulation circuit 40 is switched to the cooling medium circuit that allows the coolant to flow while bypassing the radiator unit 70. Therefore, the unnecessary heat exchange between the coolant and the outside air is suppressed so that the waste heat of the travel electric motor MG can be stored in the coolant, and the warm-up of the travel electric motor MG can be facilitated.

Further, in the heat exchanger 16 according to the present embodiment, the refrigerant side header tank 62 and the coolant side header tank 72 include the plate header members 621, 721, the communication intermediate plate members 622, 722, the blocking intermediate plate members 623, 723, and the tank header members 624, 724. Therefore, for example, when the refrigerant tubes 61 and the coolant tubes 71 are connected to the coolant side header tank 72, the connection can be performed through the coolant side communication intermediate plate member 722 and the coolant side blocking intermediate plate member 723.

Therefore, the communication state between the respective tubes 61, 71, and the internal space within the coolant side header tank 72, and the flow directions along which the refrigerant or the coolant flows in the respective tubes 61 and 71 can be easily regulated according to the positions and sizes of the first and second fluid communication holes 722a and 722b provided in the coolant communication intermediate plate member 722, and according to the positions of the first and second fluid communication holes 722a and 722b blocked by the coolant side blocking intermediate plate member 723.

For example, in the coolant side header tank 72, the first fluid communication holes 722a of the coolant side communication intermediate plate member 722 is blocked by the coolant side blocking intermediate plate member 723 in a state where the first fluid communication holes 722a is communicated with both the refrigerant tubes 61 on the upstream side and the refrigerant tubes 61 on the downstream side in the flow direction X of the outside air. With this configuration, a flow of the refrigerant is extremely easily U-turned by the first fluid communication holes 722a so that the flow direction of the refrigerant in the refrigerant tubes 61 on the upstream side and the flow direction of the refrigerant in the refrigerant tubes 61 on the downstream side in the flow direction X of the outside air can be changed.

Furthermore, the respective plate surfaces of the coolant side plate header member 721, the coolant side communication intermediate plate member 722, and the coolant side blocking intermediate plate member 723 are joined to each other, to thereby suppress the mixture of the refrigerant flowing in the first fluid communication holes 722a with the coolant flowing in the second fluid communication holes 722b of the coolant side communication intermediate plate member 722.

In other words, the respective plate surfaces of the coolant side plate header member 721, the coolant side communication intermediate plate member 722, and the coolant side blocking intermediate plate member 723 are joined to each other, to thereby prevent the refrigerant from being leaked from the first fluid communication holes 722a and prevent the coolant from being leaked from the second fluid communication holes 722b.

Therefore, the communication state between both the refrigerant tubes 61 and the coolant tubes 71 and the internal spaces within the coolant side header tank 72 (specifically, the coolant distribution space 72a and the coolant collection space 72b), and the flow direction of the refrigerant flowing in the refrigerant tubes 61 or the flow direction of the coolant flowing in the coolant tubes 71 can be regulated by the coolant side communication intermediate plate member 722 and the coolant side blocking intermediate plate member 723 each having a simple configuration in which only the fluid communication holes are formed in the plate member.

As a result, the productivity of the heat exchanger configured to realize the heat exchange among the three types of fluids including the refrigerant, the coolant and the outside air can be sufficiently improved. When the refrigerant tubes 61 and the coolant tubes 71 are connected to the refrigerant side header tank 62, the effects of the improvement in the productivity of the heat exchanger can be also obtained by intervening the refrigerant side communication intermediate plate member 622 and the refrigerant side blocking intermediate plate member 623 between the refrigerant tubes 61 and the coolant tubes 71.

(Second Embodiment)

In a present embodiment, an example in which the configuration of the refrigerant side header tank 62 and the coolant side header tank 72 is modified in the first embodiment will be described. Similarly, in the present embodiment, since the basic configuration of the refrigerant side header tank 62 and the coolant side header tank 72 is identical with each other, the detailed configuration of the coolant side header tank 72 will be described below.

Figure 9:
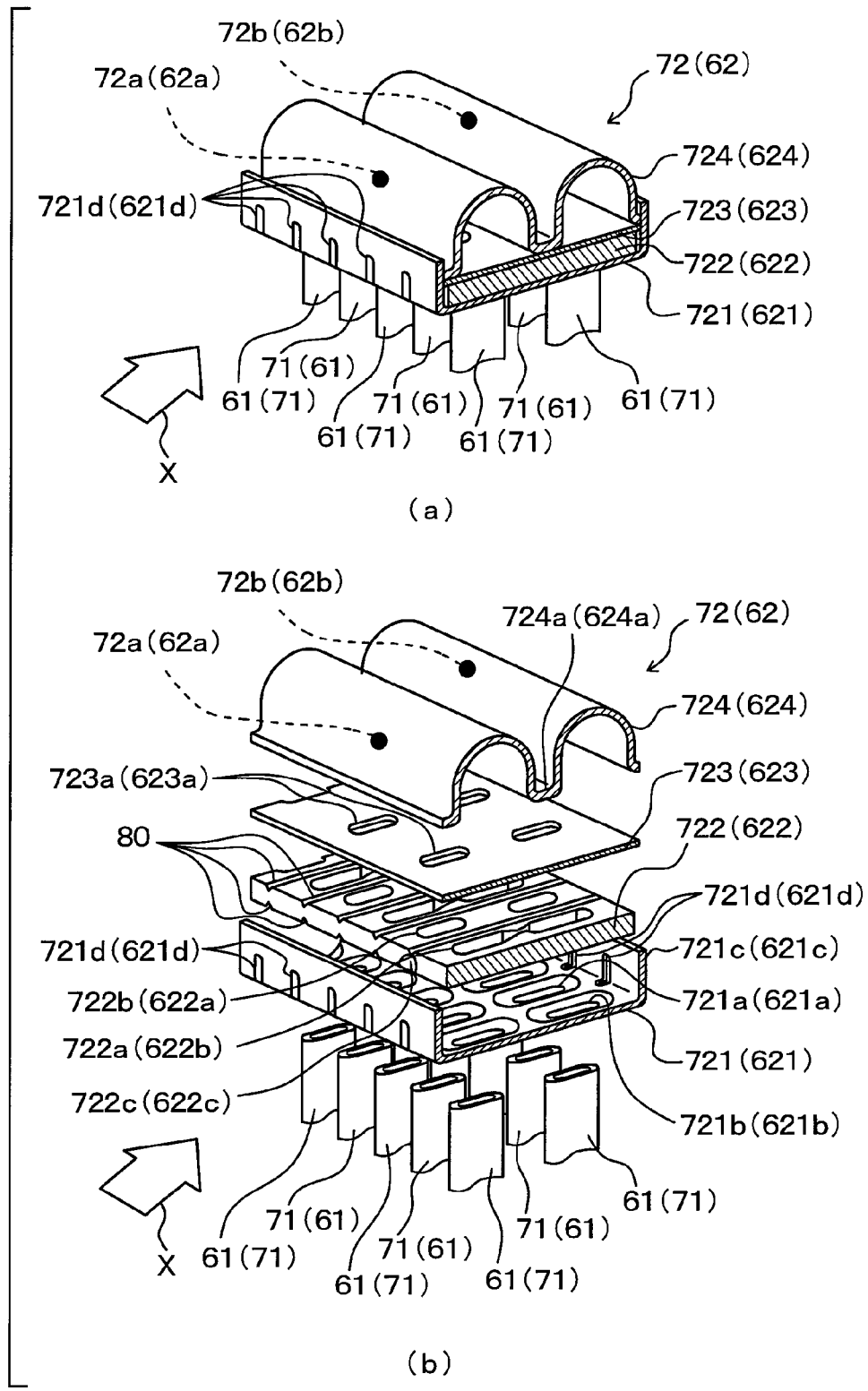
FIG. 9(a) is a partially cross-sectional view of a coolant side header tank of a heat exchanger according to a second embodiment of the present disclosure.
FIG. 9(b) is an exploded view of the coolant side header tank of FIG. 9(a).

First, as illustrated in FIG. 9, in the coolant side header tank 72 according to the present embodiment, a coolant side communication intermediate plate member 722 in which groove portions 80 are formed is applied. The groove portions 80 may be formed in at least one of the plate surfaces joined to each other in a coolant side plate header member 721, the coolant side communication intermediate plate member 722, or a coolant side blocking intermediate plate member 723. Preferably, for example, as in the present embodiment, the groove portions 80 are formed on both sides of the coolant side communication intermediate plate member 722. Specifically, the groove portions 80 according to the present embodiment are formed in the plate surface (joint surface) of the coolant side communication intermediate plate member 722 which faces the coolant side plate header member 721, and the plate surface of the coolant side communication intermediate plate member 722 which faces the coolant side blocking intermediate plate member 723. The groove portions 80 are formed by recessing both of the plate surfaces of the coolant side communication intermediate plate member 722. FIG. 9 is a partially cross-sectional view and an exploded perspective view of the coolant side header tank 72 in a heat exchanger 16, which corresponds to FIG. 6 of the first embodiment.

Further, the groove portions 80 are formed to extend across regions between a first fluid communication holes 722a and a second fluid communication holes 722b which are adjacently arranged, and extend from one end side of the coolant side communication intermediate plate member 722 to the other end side thereof in the width direction (the same direction as the flow direction X of the outside air).

In other words, the groove portions 80 is formed to extend from a region of the joint surface between the first fluid communication holes 722a and the second fluid communication holes 722b to the end of the coolant side communication intermediate plate member 722 in the width direction, when the coolant side communication intermediate plate member 722 is joined to the coolant side plate header member 721 and the coolant side blocking intermediate plate member 723.

Further, as described in FIG. 8 of the first embodiment, external spaces B communicated with the outside air are formed between both sides of the coolant side communication intermediate plate member 722 in the width direction, and the inside of the coolant side plate header member 721. Therefore, the groove spaces formed within the groove portions 80 when the coolant side communication intermediate plate member 722 is joined to the coolant side plate header member 721 and the coolant side blocking intermediate plate member 723 are communicated with the external spaces B at ends thereof. In short, the groove spaces within the groove portions 80 are continuously connected from the regions between the first fluid communication holes 722a and the second fluid communication holes 722b which are adjacently arranged to the external spaces B.

Also, in the coolant side plate header member 721 of the coolant side header tank 72 according to the present embodiment, slit holes 721d are formed in claw portions 721c described in the first embodiment. The slit holes 721d are through-holes that penetrate through both sides of the coolant side plate header member 721, and are formed at positions corresponding to the ends of the groove portions 80 formed in the coolant side communication intermediate plate member 722 in multiple places.

In the present embodiment, forming of the slit holes 721d at the positions corresponding to the ends of the groove portions 80 means that the ends of the groove portions 80 formed in the coolant side communication intermediate plate member 722 are formed at visible positions through the slit holes 721d when the coolant side header tank 72 is viewed from the flow direction X of the outside air.

Also, in the present embodiment, in the refrigerant side header tank 62, a refrigerant side communication intermediate plate member 622 is employed, in which the same groove portions 80 as those in the coolant side communication intermediate plate member 722 are formed. A refrigerant side plate header member 621 is employed, in which the same slit holes 621d as those in the coolant side plate header member 721 are formed.

The other configurations of the heat exchanger 16 are identical with those in the first embodiment. Therefore, in a vehicle air conditioner 1 according to the present embodiment, the same functions as those in the first embodiment can be fulfilled. Further, in the heat exchanger 16 according to the present embodiment, the productivity of the heat exchanger configured to realize the heat exchange among three types of fluids can be sufficiently improved as in the first embodiment.

In addition, according to the heat exchanger 16 of the present embodiment, since the coolant side communication intermediate plate member 722 having the groove portions 80 formed therein is applied, even if the refrigerant flowing in the first fluid communication holes 722a, or the coolant flowing in the second fluid communication holes 722b is leaked from between the respective joint surfaces of the coolant side plate header member 721, the coolant side communication intermediate plate member 722 and the coolant side blocking intermediate plate member 723, the refrigerant or the coolant can be guided into the groove spaces formed within the groove portions 80. Therefore, the refrigerant and the coolant can be prevented from being mixed together.

Further, since the groove spaces are communicated with the external spaces B, the refrigerant and the coolant leaked onto the above-mentioned joint surfaces can be discharged toward the external spaces B, that is, the exterior of the heat exchanger 16. For that reason, one fluid among the refrigerant and the coolant leaked on the joint surface can be prevented from being mixed with the other fluid within the first fluid communication holes 722a or the second fluid communication holes 722b.

Also, since the ends of the groove portions 80 to which the refrigerant or the coolant is leaked are visibly positioned through the slit holes 721d, it can be easily confirmed that the refrigerant or the coolant is leaked from the ends of the groove portions 80. Further, a high pressure air is sealed into the heat exchanger 16 after the heat exchanger 16 has been manufactured, and an air leakage from the ends of the groove portions 80 is confirmed whereby a manufacturing failure of the heat exchanger 16 can be easily detected.

Also, since the thickness dimension of the coolant side communication intermediate plate member 722 is larger than the thickness dimension of the coolant side plate header member 721 or the coolant side blocking intermediate plate member 723 as described above, the groove portions 80 according to the present embodiment can be easily formed by merely subjecting the coolant side communication intermediate plate member 722 to simple processing.

(Third Embodiment)

In the above-mentioned second embodiment, an example in which the groove portions 80 are formed in the coolant side communication intermediate plate member 722 is described. In a present embodiment, as illustrated in FIG. 10, the same groove portions 80 as those in the second embodiment are formed in a surface of a coolant side plate header member 721, which is joined to a coolant side communication intermediate plate member 722, and in a surface of a coolant side blocking intermediate plate member 723, which is joined to the coolant side communication intermediate plate member 722.

Figure 10:
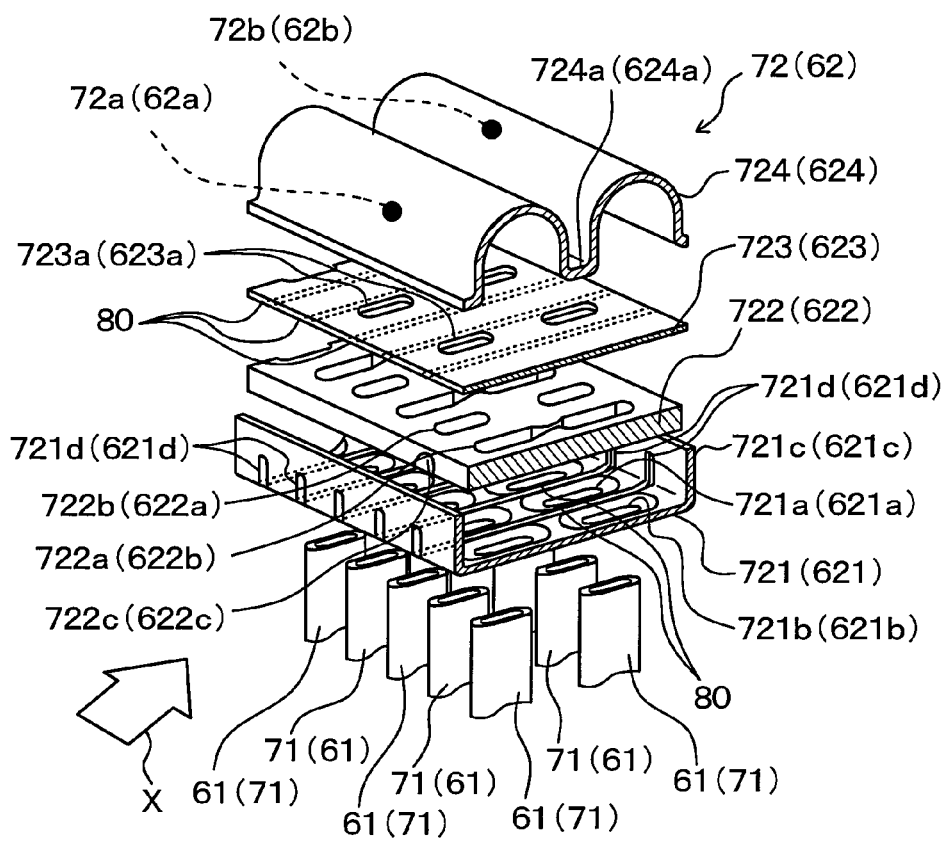
FIG. 10 is an exploded view of a coolant side header tank according to a third embodiment of the present disclosure.

FIG. 10 is a partially exploded perspective view of a coolant side header tank 72 in a heat exchanger 16 according to the present embodiment, which corresponds to FIG. 6(b) of the first embodiment. The other configurations are identical with those in the second embodiment.

Even if groove portions 80 are thus formed in the coolant side plate header member 721 and the coolant side blocking intermediate plate member 723, the groove spaces formed within the groove portions 80 can be communicated with external spaces B, as in the second embodiment. Therefore, the refrigerant and the coolant leaked from between the joint surfaces can be guided into the external spaces B through the groove spaces of the groove portions 80, and exactly the same advantages as those in the second embodiment can be obtained.

That is, any member among the coolant side plate header member 721, the coolant side communication intermediate plate member 722 and the coolant side blocking intermediate plate member 723 may be applied as the region in which the groove portions 80 are formed, if the plate surfaces joined to each other are the coolant side plate header member 721, the coolant side communication intermediate plate member 722 or the coolant side blocking intermediate plate member 723.

Therefore, for example, in the joint surface between the coolant side plate header member 721 and the coolant side communication intermediate plate member 722, the groove portions 80 may be formed in the coolant side plate header member 721 as in the present embodiment. In the joint surface between the coolant side communication intermediate plate member 722 and the coolant side blocking intermediate plate member 723, the groove portions 80 may be formed in the coolant side communication intermediate plate member 722 as in the second embodiment.

(Fourth Embodiment)

Figure 11:
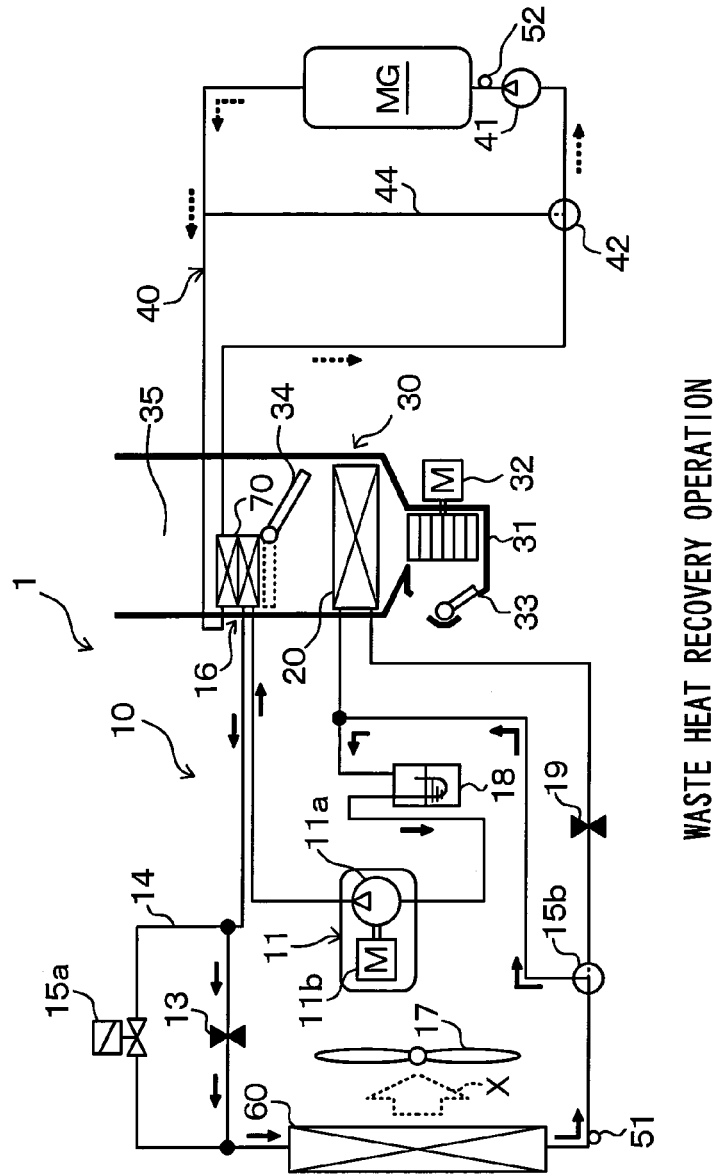
FIG. 11 is a schematic view illustrating waste heat recovery operation of a vehicle air conditioner according to a fourth embodiment of the present disclosure.

In a present embodiment, as illustrated in the overall configuration diagram of FIG. 11, an example in which the configuration of a heat pump cycle 10 is changed in the first embodiment will be described. FIG. 11 is an overall configuration diagram illustrating the refrigerant passage in the waste heat recovery operation according to the present embodiment, in which a flow of the refrigerant in the heat pump cycle 10 is indicated by solid arrows, and a flow of the coolant in a coolant circulation circuit 40 is indicated by dashed arrows.

Specifically, in the present embodiment, a vehicle interior condenser 12 in the first embodiment is omitted, and a combined heat exchanger 16 of the first embodiment is arranged within a casing 31 of a vehicle interior air conditioning unit 30. Then, in the heat exchanger 16, a vehicle exterior heat exchange unit 60 of the first embodiment functions as the vehicle interior condenser 12. Hereinafter, a region of the heat exchanger 16 which functions as the vehicle interior condenser 12 is represented as a vehicle interior condenser.

On the other hand, the vehicle exterior heat exchange unit 60 is configured as a single heat exchanger that exchanges a heat between the refrigerant flowing therein and the outside air blown from an air blowing fan 17. The other configurations are identical with those in the first embodiment. Also, in the present embodiment, the defrosting operation is not executed, but the other actuations are identical with those in the first embodiment.

Therefore, in the waste heat recovery operation according to the present embodiment, the vehicle interior blowing air exchanges a heat with a compressor 11 discharge refrigerant, and is heated in the vehicle interior condenser of the heat exchanger 16. Further, the vehicle interior blowing air heated by the vehicle interior condenser can exchange the heat with the coolant, and be heated in a radiator unit 70 of the heat exchanger 16.

Further, according to the configuration of the heat pump cycle 10 in the present embodiment, since the heat exchange can be performed between the coolant and the vehicle interior blowing air, the heating in the vehicle interior can be realized even if the actuation of the heat pump cycle 10 (specifically, compressor 11) stops. Also, even if the temperature of the compressor 11 discharge refrigerant is low, and a heating capability of the heat pump cycle 10 is low, the heating in the vehicle interior can be realized.

It is needless to say that the heat exchanger 16 described in the second and third embodiments may be applied to the heat pump cycle 10 of the present embodiment.

(Other Embodiments)

The present disclosure is not limited to the above embodiments, but can be variously modified without departing from the spirit of the present disclosure as follows.

(1) In the above-mentioned embodiments, the example in which the distribution spaces 62a and 72a are arranged on the upstream side, and the collection spaces 62b and 72b are arranged on the downstream side in the flow direction X of the outside air has been described as the internal spaces of the respective header tanks 62 and 72. However, the configuration of the internal spaces of the respective refrigerant side header tanks 62 and 72 is not limited to the above configuration. For example, collection spaces 62b and 72b may be arranged on the upstream side, and distribution spaces 62a and 72a may be arranged on the downstream side in the flow direction X of the outside air.

Further, the flow of the refrigerant flowing in the adjacent refrigerant tubes 61 and the coolant flowing in the coolant tubes 71 may flow in a direction opposite (counterflow) to the flow direction X of the outside air from the macroscopic viewpoint, for example, in such a manner that the flow of the refrigerant is U-turning in the following order: the refrigerant tubes 61 arranged on the downstream side in the flow direction X of the outside air; the first fluid communication holes 722a within the coolant side header tank 72; and the refrigerant tubes 61 arranged on the upstream side in the flow direction X of the outside air.

Also, for example, spaces for collecting or distributing the refrigerant may be formed as the internal spaces of the coolant side header tank 72. The above formation of the plural types of spaces within the coolant side header tank 72 can be easily realized by provision of means for providing the internal spaces extending in the stacking direction of the respective tubes 61 and 71 in plural rows, or by provision of separators (partition members) for dividing the respective internal spaces in the stacking direction of the respective tubes 61 and 71.

Figure 12:
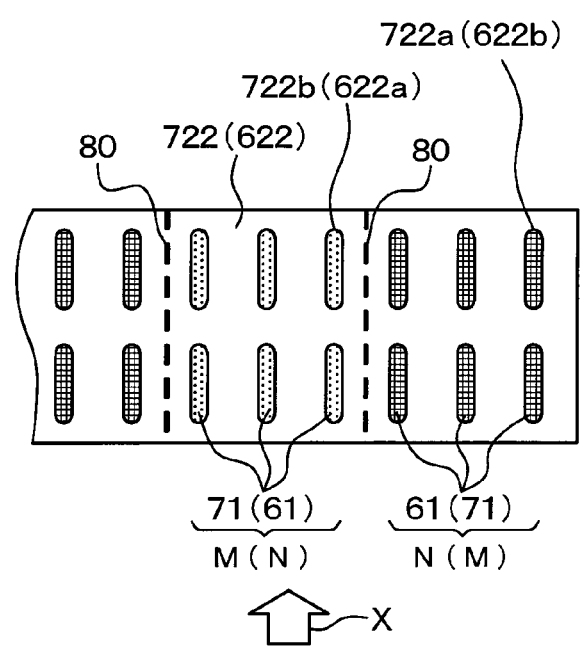
FIG. 12 is a schematic view illustrating an alignment of respective tubes and an arrangement of groove portions in a heat exchanger according to a modified example of the present disclosure.

With the above configuration, the arrangement of the respective tubes 61 and 71 can be also changed. For example, as illustrated in FIG. 12, after a plurality (N) of refrigerant tubes 61 has been successively stacked on each other, a plurality (M) of coolant tubes 71 may be continuously stacked. In this situation, the numbers of refrigerant tubes 61 and coolant tubes 71 which are continuously stacked on each other may be the same, or different.

Figure 13:
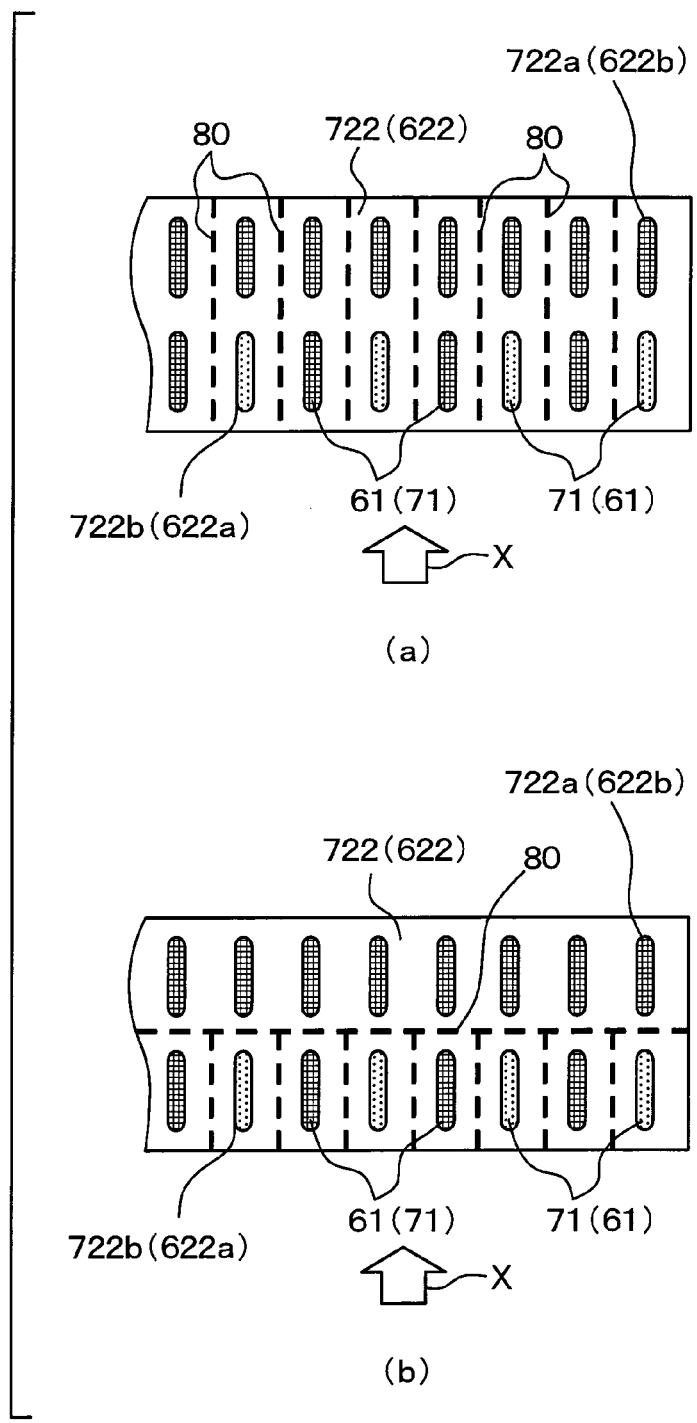
FIG. 13(a) is a schematic view illustrating an alignment of respective tubes and an arrangement of groove portions in a heat exchanger according to one modified example of the present disclosure.
FIG. 13(b) is a schematic view illustrating an alignment of respective tubes and an arrangement of groove portions in a heat exchanger according to another modified example of the present disclosure.

Also, as illustrated in FIG. 13, the refrigerant tubes 61 and the coolant tubes 71 may be alternately stacked on one side (for example, upstream side) in the flow direction X of the outside air, and the refrigerant tubes 61 may be continuously stacked on the other side (for example, downstream side) in the flow direction X of the outside air (mix and all arrangement).

FIGS. 12 and 13 are partially top views of the communication intermediate plate member 722 (622) viewed from the longitudinal direction of the respective tubes 61 and 71, which are illustrative views illustrating an alignment of respective tubes 61, 71, and an arrangement of the groove portions 80. In FIGS. 12 and 13, for clarification of the illustration, one of the refrigerant tubes 61 and the coolant tubes 71 is indicated by mesh hatching, and the other of the refrigerant tubes 61 and the coolant tubes 71 is indicated by dot hatching.

Also, as illustrated in FIG. 12, when the respective tubes 61 and 71 are aligned, the groove portions 80 may be provided as indicated by thick dashed lines in FIG. 12. It is needless to say that the groove portions 80 are not limited to the communication intermediate plate members 622 and 722, but may be formed on the plate header members 621, 721, and blocking intermediate plate members 623, 723.

Further, when the respective tubes 61 and 71 are aligned as illustrated in FIG. 13, the groove portions 80 may be arranged as indicated by thick dashed lines in FIGS. 13(*a*) and 13(*b*). That is, the groove portions 80 may extend to the end of the communication intermediate plate member 722 (622) across the regions between the first fluid communication holes 722*a* (622*b*) and the second fluid communication holes 722*b* (622*a*) so as to partition the first fluid communication holes and the second fluid communication holes which are adjacently arranged.

Therefore, the groove portions 80 are not limited to the groove portions extended from one end side to the other end side in the width direction (the same direction as the flow direction X of the outside air), but may extend in the stacking direction of the respective tubes 61 and 71 (in the longitudinal direction of the header tanks 62 and 72 perpendicular to the flow direction X of the outside air) as indicated by the thick dashed lines of FIG. 13(*b*). The groove spaces formed within the groove portions 80 may be communicated with the external spaces on the end of the communication intermediate plate member 722 (622) in the stacking direction thereof. In the arrangement of the groove portions 80 illustrated in FIG. 13(*b*), the groove portions 80 are disposed along a polygonal line, but are not limited to the polygonal line, and may be disposed along a curve or a polygonal line. With this arrangement, even in the configuration of the header tanks 62 and 72 where it is difficult to arrange the spatially continuous groove portions 80 along one straight line, the spatially continuous groove portions 80 can be arranged.

Also, in the above-mentioned embodiment, for example, the groove portions 80 are formed to extend from one end of the communication intermediate plate members 722 (622) to the other end thereof. However, if any one end of the groove portions 80 is communicated with the external spaces B, the refrigerant or the coolant can be guided into the external spaces B. That is, the groove portions 80 may be formed to extend from the region between the first fluid communication holes and the second fluid communication holes which are adjacently arranged to the end of the plate surface of the member in which the groove portions 80 are formed.

(2) In the above-mentioned embodiment, the example in which the groove portions 80 are formed by recessing the plate surface (joint surface) of the plate header members 621, 721, the communication intermediate plate members 622, 722, or the blocking intermediate plate members 623, 723 is described. However, the groove portions 80 are not limited to the above configuration. For example, the groove portions 80 may be formed of through-holes that penetrate through both sides of the plate surface of the communication intermediate plate members 622 and 722.

Figure 14:
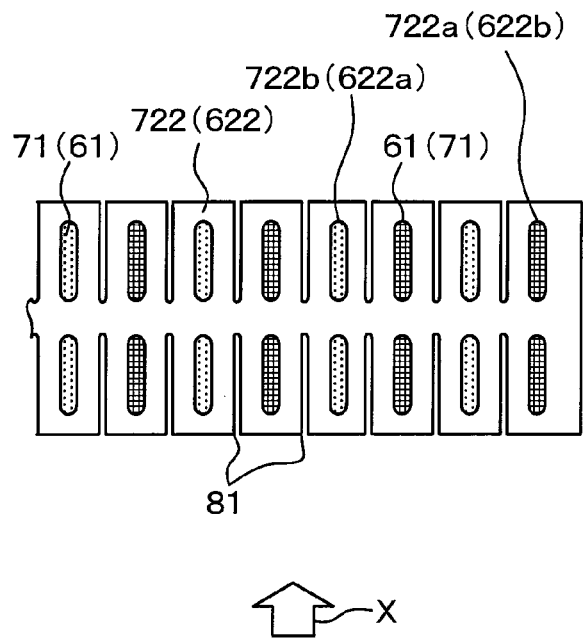
FIG. 14 is a top view of a communication intermediate plate member according to a modified example of the present disclosure.

In this way, if the groove portions 80 are formed of the through-holes, as illustrated in a top view of the communication intermediate plate member 722 (622) in FIG. 14, the through-holes may be formed to extend from the end of the communication intermediate plate member 722 to the region between the first fluid communication holes 722*a* (622*a*) and the second fluid communication holes 722*b* (622*b*).

(3) In the above-mentioned second embodiment, as illustrated in FIG. 8, the groove spaces within the groove portions 80 are communicated with the external spaces B present between both of sides of the coolant side communication intermediate plate member 722 in the width direction and the inside of the coolant side plate header member 721. The groove spaces may be communicated not only with the portions indicated by symbol B in FIG. 8 but also with any portion of the external spaces B of the heat exchanger 16. For example, since the outdoor air passages 16*a* is a part of the space in which the outside air is present, that is, a part of the external spaces B of the heat exchanger 16, the groove spaces within the groove portions 80 may be opened to the outdoor air passages 16*a*, and communicated with the outdoor air passages 16*a*.

Figure 15:
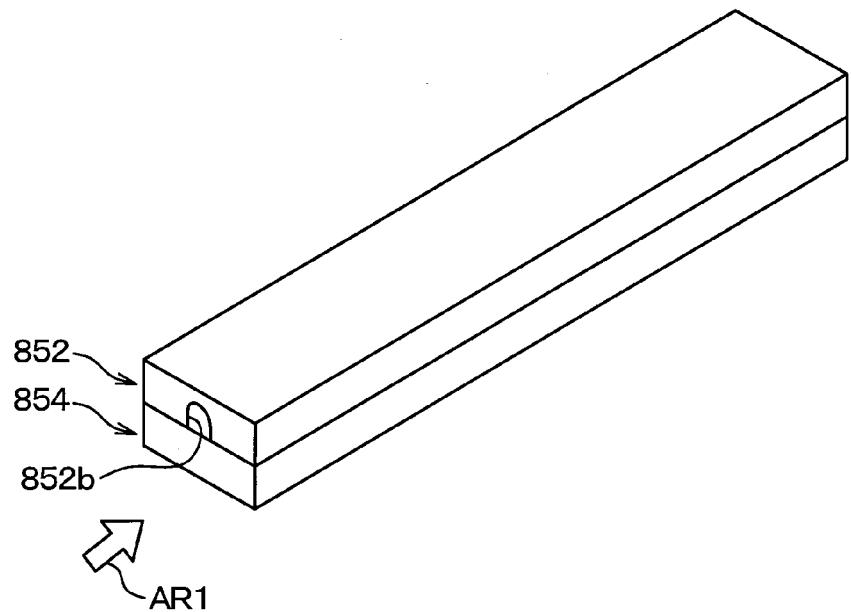
FIG. 15 is a schematic perspective view illustrating a first groove configuration example of the groove portions according to the present disclosure.
Figure 16:
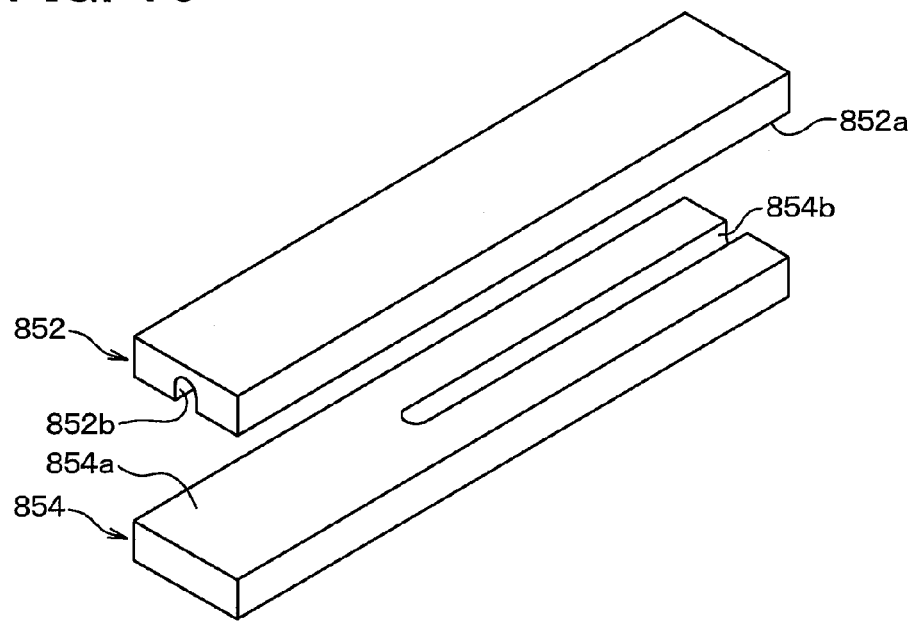
FIG. 16 is an exploded view of the groove portions in FIG. 15.
Figure 17:
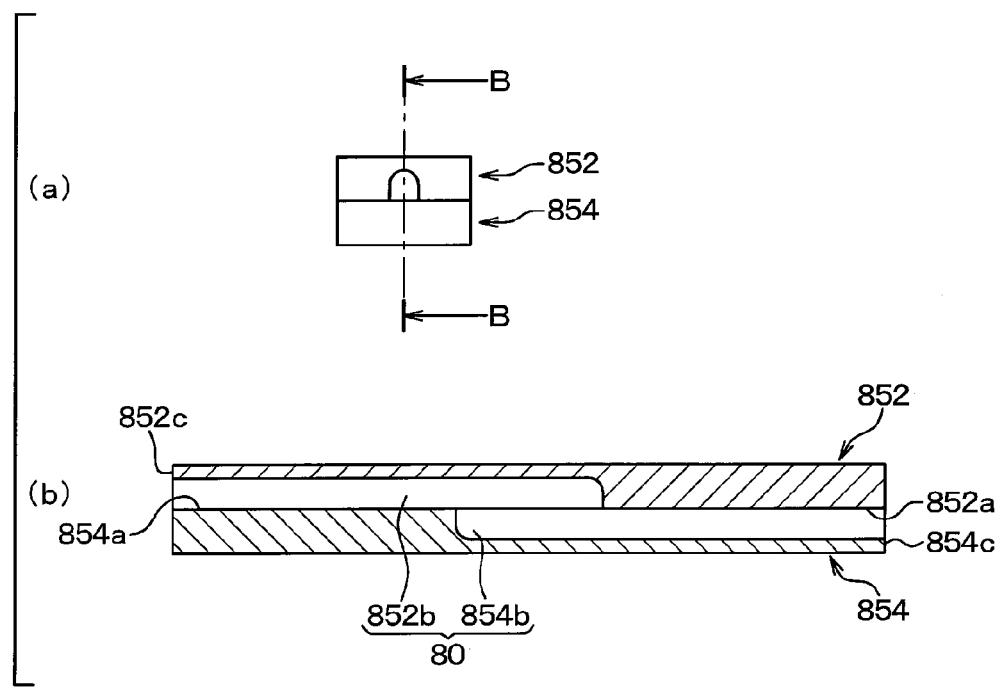
FIG. 17($a$) is a side view of the groove portions of FIG. 15 viewed from a direction of an arrow AR1.
Figure 18:
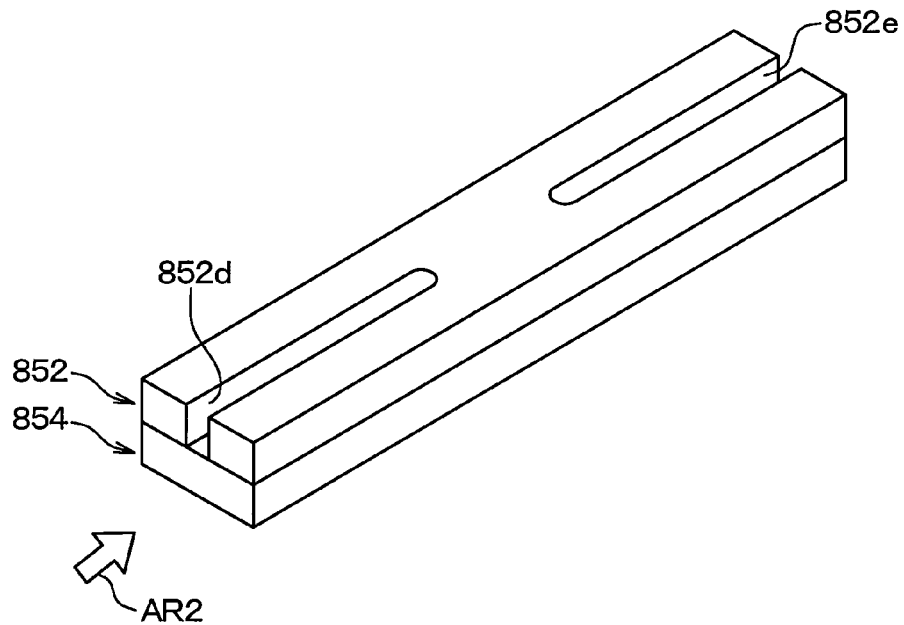
FIG. 18 is a schematic perspective view illustrating a second groove configuration example of the groove portions according to the present disclosure.
Figure 19:
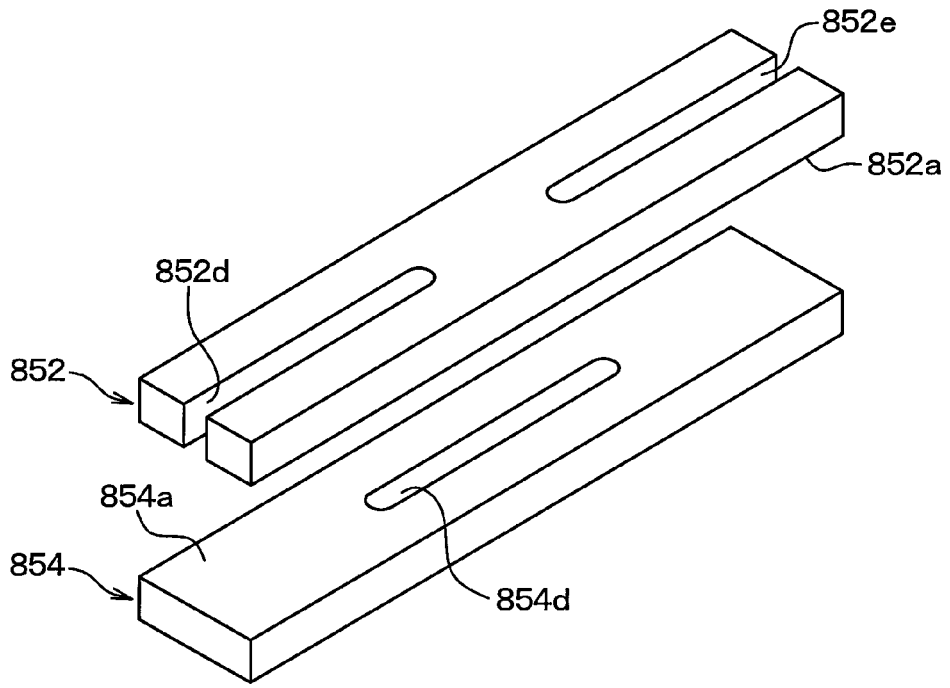
FIG. 19 is an exploded view of the groove portions in FIG. 18.
Figure 20:
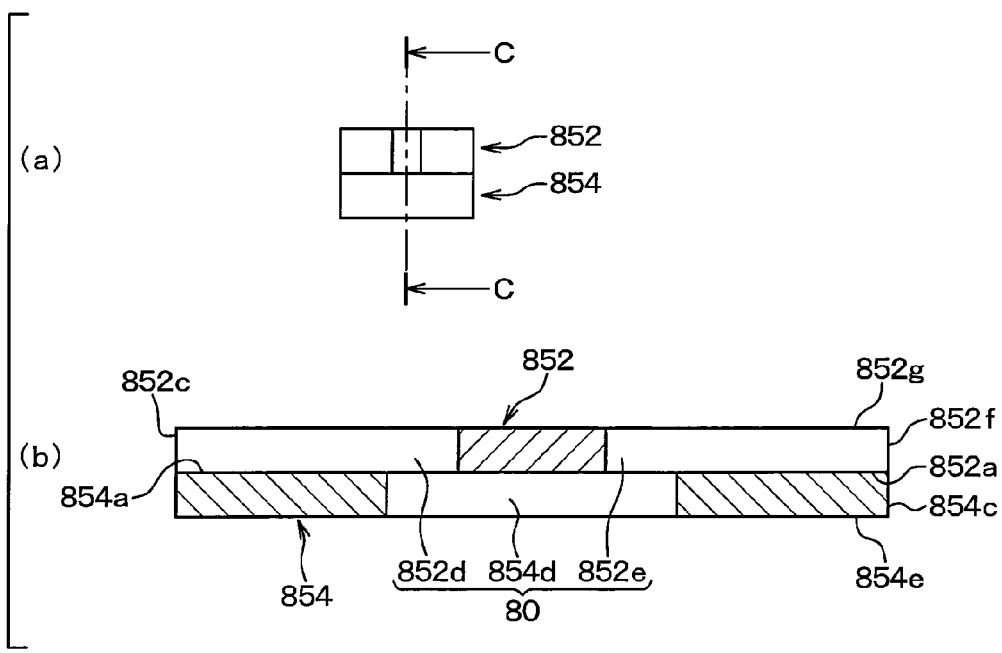
FIG. 20($a$) is a side view of the groove portions of FIG. 18 viewed from a direction of an arrow AR2.
Figure 21:
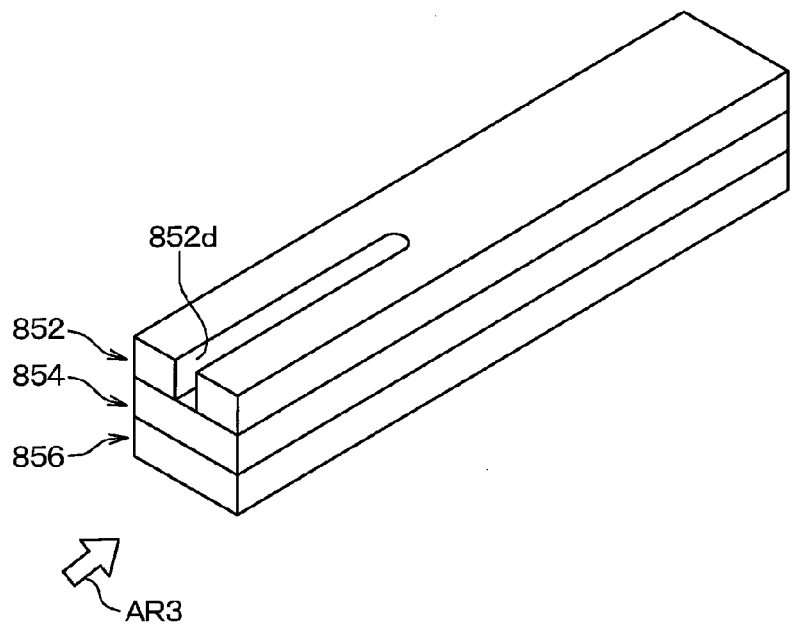
FIG. 21 is a schematic perspective view illustrating a third groove configuration example of the groove portions according to the present disclosure.
Figure 22:
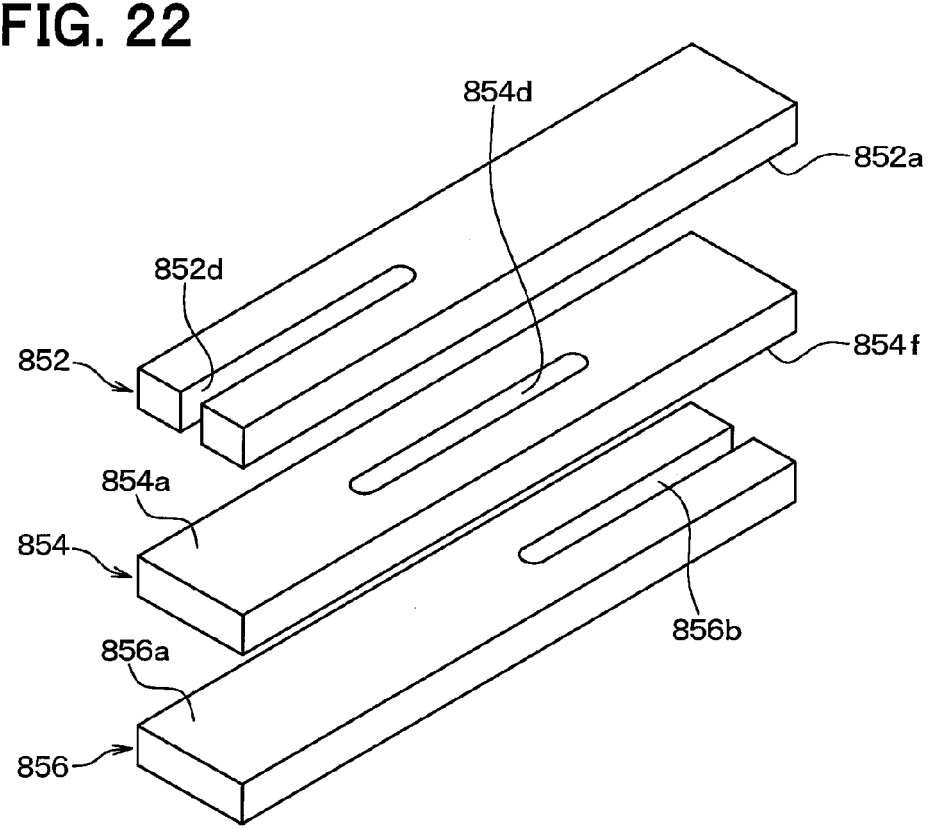
FIG. 22 is an exploded view of the groove portions in FIG. 21.
Figure 23:
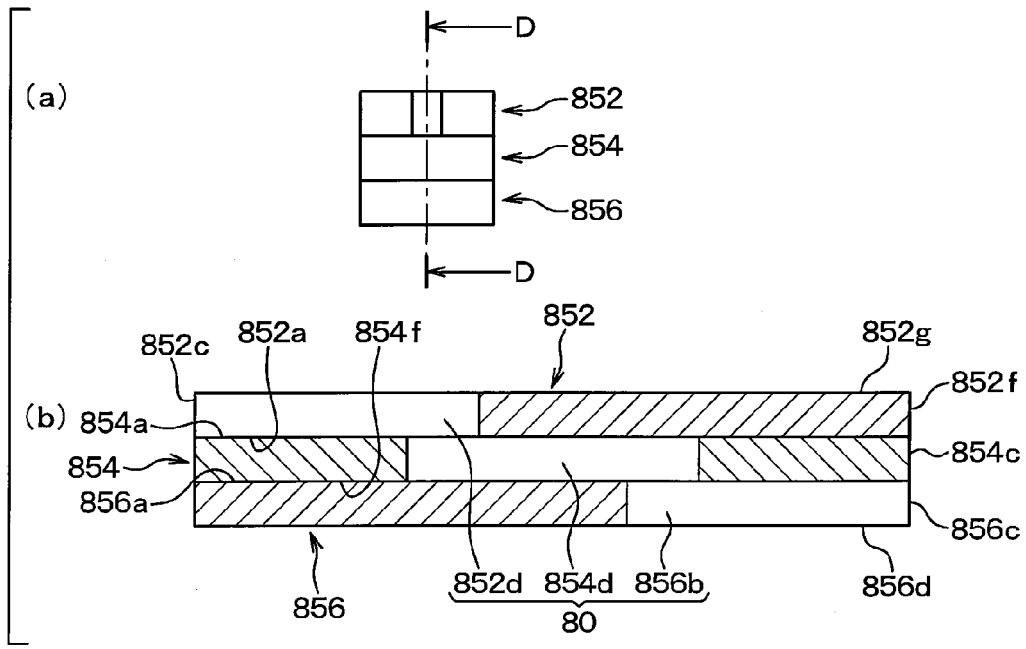
FIG. 23($a$) is a side view of the groove portions of FIG. 21 viewed from a direction of an arrow AR3.

(4) For example, in the above-mentioned coolant side header tank 72 according to the second embodiment, the groove portions 80 are formed in the coolant side communication intermediate plate member 722 as illustrated in FIG. 9, and a sequence of groove portions 80 are formed in one member. However, the groove portions 80 may be formed over the members. Examples in which the sequence of groove portions 80 are formed over the members is schematically illustrated in FIGS. 15 to 23. A configuration example of the groove portions 80 illustrated in FIGS. 15 to 17 is called "first groove configuration example", a configuration example of the groove portions 80 illustrated in FIGS. 18 to 20 is called "second groove configuration example", and a configuration example of the groove portions 80 illustrated in FIGS. 21 to 23 is called "third groove configuration example".

First, the first groove configuration example will be described. FIG. 15 illustrates a perspective view of the overall first groove configuration example, FIG. 16 illustrates an exploded perspective view of FIG. 15, FIG. 17(*a*) illustrates a side view when viewed in an arrow AR1 direction of FIG. 15, and FIG. 17(b) illustrates a cross-sectional view taken along a line B-B of FIG. 17(a).

In the first groove configuration example, as illustrated in FIG. 15, two plate-like members, specifically, a first plate member 852 and a second plate member 854 are joined to each other so that the respective joint plate surfaces 852a and 854a face each other. For example, when attention is paid to the coolant side header tank 72 in FIG. 9, the first plate member 852 corresponds to the coolant side blocking intermediate plate member 723, and the second plate member 854 corresponds to the coolant side communication intermediate plate member 722. Also, as illustrated in FIGS. 16 and 17, the joint plate surface 852a of the first plate member 852 is formed with a first groove portion 852b having a configuration recessed in the joint plate surface 852a, and the joint plate surface 854a of the second plate member 854 is formed with a second groove portion 854b having a configuration recessed in the joint plate surface 854a.

The first groove portion 852b is disposed to extend from a center portion of the first plate member 852 to one end 852c of the first plate member 852, and is opened to the external at the one end 852c. On the other hand, the second groove portion 854b is disposed to extend from a center portion of the second plate member 854 to the other end 854c of the second plate member 854 located at a side opposite to the one end 852c, and is opened to the external at the other end 854c.

In the center portions of the first plate member 852 and the second plate member 854, the first groove portion 852b and the second groove portion 854b are communicated with each other, as a result of which the first groove portion 852b and the second groove portion 854b configure a sequence of groove portions 80. That is, the groove spaces within the groove portions 80 are continuously connected from the one end 852c of the first plate member 852 to the other end 854c of the second plate member 854 by communicating parts of those two groove portions 852b and 854b with each other.

Subsequently, the second groove configuration example will be described. FIG. 18 illustrates a perspective view of the overall second groove configuration example, FIG. 19 illustrates an exploded perspective view of FIG. 18, FIG. 20(a) illustrates a side view when viewed in an arrow AR2 direction of FIG. 18, and FIG. 20(b) illustrates a cross-sectional view taken along a line C-C of FIG. 20(a).

In the second groove configuration example, as illustrated in FIG. 18, the first plate member 852 and the second plate member 854 are joined to each other so that the respective joint plate surfaces 852a and 854a face each other as in the above-mentioned first groove configuration example. However, unlike the first groove configuration example, as illustrated in FIGS. 19 and 20, the first plate member 852 is formed with a first groove portion 852d and a second groove portion 852e each configured by a through-groove (throughhole) that penetrates through both sides of the first plate member 852. Also, the second plate member 854 is formed with a third groove portion 854d configured by a throughgroove.

The first groove portion 852d is disposed to extend from a center portion of the first plate member 852 to the one end 852c of the first plate member 852, and is opened toward the external at the one end 852c along the longitudinal direction of the first groove portion 852d. Also, the second groove portion 852e is disposed to be distant from the first groove portion 852d, and extend from the center portion of the first plate member 852 to the other end 852f of the first plate member 852, and is opened toward the external at the other end 852f along the longitudinal direction of the second groove portion 852e. On the other hand, the third groove portion 854d is disposed between a region corresponding to an end (base end) of the first groove portion 852d on a side of the second groove portion 852e and a region corresponding to an end (base end) of the second groove portion 852e on a side of the first groove portion 852d.

The first groove portion 852d is communicated with one end of the third groove portion 854d at the base end of the first groove portion 852d. The second groove portion 852e communicated with the other end of the third groove portion 854d at the base end of the second groove portion 852e. With the above configuration, the first groove portion 852d, the second groove portion 852e and the third groove portion 854d configure a sequence of groove portions 80. That is, the groove spaces within the groove portions 80 are continuously connected from the one end 852c to other end 852f of the first plate member 852 since parts of the groove portions 852d, 852e and 854d communicate with each other.

Also, the three groove portions 852d, 852e, and 854d are each configured by the through-groove. Therefore, the groove portion 80 is opened to the external in an outside plate surface 852g at a side opposite to the joint plate surface 852a of the first plate member 852, and an outside plate surface 854e at a side opposite to the joint plate surface 854a of the second plate member 854.

Subsequently, the third groove configuration example will be described. FIG. 21 illustrates a perspective view of the overall third groove configuration example, FIG. 22 illustrates an exploded perspective view of FIG. 21, FIG. 23(a) illustrates a side view when viewed in an arrow AR3 direction of FIG. 21, and FIG. 23(b) illustrates a cross-sectional view taken along a line D-D of FIG. 23(a).

In the third groove configuration example, as illustrated in FIG. 21, the first plate member 852, the second plate member 854, and a third plate member 856 are stacked on each other in a thickness direction in order. The first plate member 852 and the second plate member 854 are joined to each other so that the respective joint plate surfaces 852a and 854a face each other, and the second plate member 854 and the third plate member 856 are joined to each other so that respective joint plate surfaces 854f and 856a face each other.

The first groove portion 852d and the third groove portion 854d in the third groove configuration example are identical with those in the above-mentioned second groove configuration example. However, in the third groove configuration example, the second groove portion 852e is not disposed in the first plate member 852. Instead, a second groove portion 856b is disposed in the third plate member 856. The second groove portion 856b of the third plate member 856 is a similar through-groove as the second groove portion 852e of the first plate member 852 in the second groove configuration example. That is, the second groove portion 856b formed in the third plate member 856 is disposed to extend from a region corresponding to the other end of the above-mentioned third groove portion 854d to the other end 856c of the third plate member 856 located at the same side as the other end 852f of the first plate member 852. The second groove portion 856b is opened to the external along the longitudinal direction of the second groove portion 856b at the other end 856c thereof.

The first groove portion 852d is communicated with one end of the third groove portion 854d at the base end of the first groove portion 852d. The second groove portion 856b is communicated with the other end of the third groove portion 854d at the base end (the end of the first groove portion 852d side) of the second groove portion 856b. With the above configuration, the first groove portion 852d, the second groove portion 856b, and the third groove portion 854d configure a sequence of groove portions 80. That is, the groove spaces within the groove portions 80 are continuously connected from the one end 852c of the first plate member 852 to the other end 856c of the third plate member 856 since parts of the three groove portions 852d, 854d, and 856b communicate with each other.

Also, since the first groove portion 852d is configured by a through-groove, the groove portion 80 is opened to the external in the outside plate surface 852g of the first plate member 852. Likewise, since the second groove portion 856b is configured by a through-groove, the groove portion 80 is also opened to the external in an outside plate surface 856d at a side opposite to a joint plate surface 856a of the third plate member 856.

Figure 24:
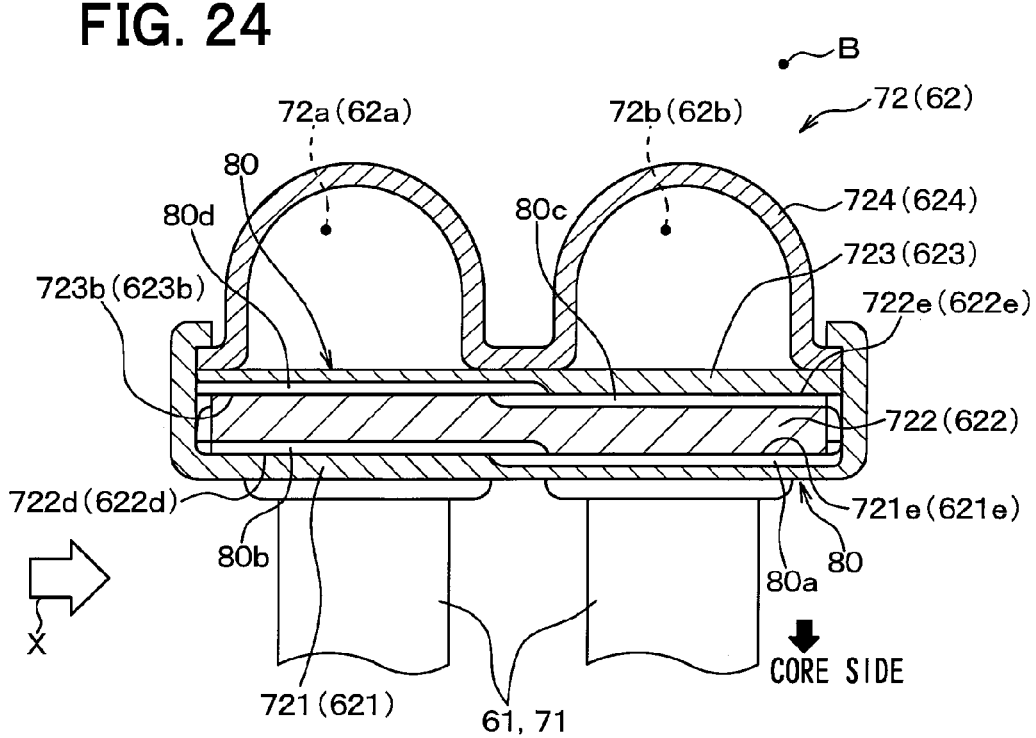
FIG. 24 is a cross-sectional view of a coolant side header tank in which a center of the groove portions is cut along a longitudinal direction thereof as in FIG. 8, when the first to third groove configuration examples illustrated in FIGS. 15 to 23 are applied to the groove portion of the second embodiment.
Figure 25:
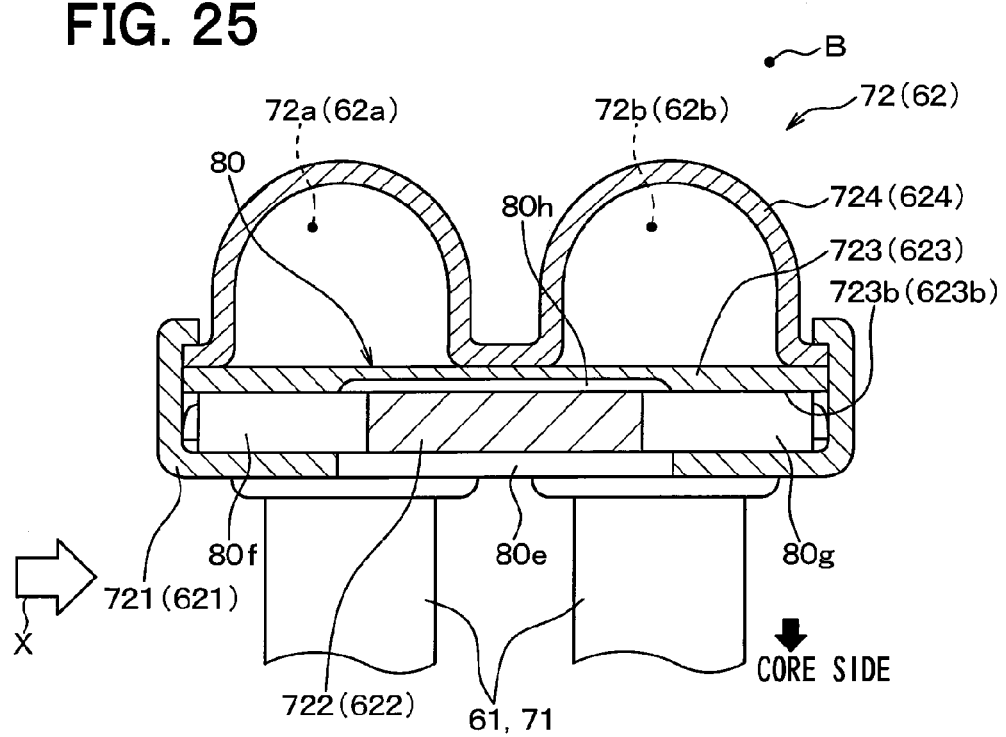
FIG. 25 is a cross-sectional view of a coolant side header tank in which a center of the groove portions is cut along a longitudinal direction thereof as in FIG. 8, when the first to third groove configuration examples illustrated in FIGS. 15 to 23 are applied to the groove portion of the second embodiment.
Figure 26:
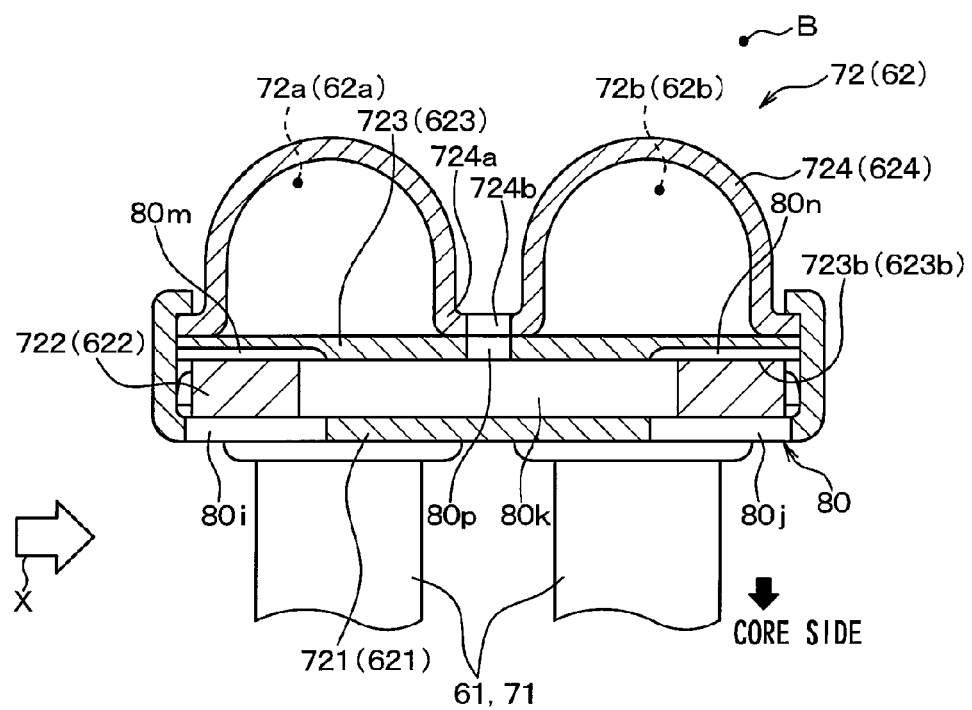
FIG. 26 is a cross-sectional view of a coolant side header tank in which a center of the groove portions is cut along a longitudinal direction thereof as in FIG. 8, when the first to third groove configuration examples illustrated in FIGS. 15 to 23 are applied to the groove portion of the second embodiment.

If the above first to third groove configuration examples are applied to the above-mentioned groove portions 80 of the second embodiment, the groove portions 80 are configured, for example, as illustrated in FIGS. 24, 25, and 26. FIGS. 24, 25, and 26 are cross-sectional views of the coolant side header tank 72 as in FIG. 8, which illustrate cross-sections when a center of the groove portion 80 is cut along the longitudinal direction thereof.

In an example of FIG. 24, the grooves 80 are formed in each of a pair of plate surfaces (joint surfaces) 721e and 722d which are joined to and face each other, in the coolant side plate header member 721 and the coolant side communication intermediate plate member 722. Parts of two groove portions 80 (80a, 80b) formed in the pair of plate surfaces 721e and 722d, respectively, are communicated with each other to form one groove space within the groove portion 80, and the groove space is continuously connected to the outer space B of the heat exchanger 16. Specifically, the coolant side plate header member 721 is formed with a first groove portion 80a having a configuration recessed in the plate surface 721e, and the first groove portion 80a is opened to the external spaces B on the downstream side in the flow direction X of the outside air.

Also, the coolant side communication intermediate plate member 722 is formed with a second groove portion 80b having a configuration recessed in the plate surface 722d, and the second groove portion 80b is opened to the external spaces B on the upstream side in the flow direction X of the outside air. Then, a part of the first groove portion 80a formed in the coolant side plate header member 721, and a part of the second groove portion 80b formed in the coolant side communication intermediate plate member 722 are communicated with each other. As a result, the groove space within the groove portion 80 combining the first groove portion 80a and the second groove portion 80b together is communicated with the outer space B on the upstream side in the flow direction X of the outside air, and also communicated with the external spaces B on the downstream side.

In the joint portions of the coolant side communication intermediate plate member 722 and the coolant side blocking intermediate plate member 723, in the same manner as the joint portions of the coolant side plate header member 721 and the coolant side communication intermediate plate member 722 described above, the coolant side communication intermediate plate member 722 is formed with a third groove portion 80c having a configuration recessed in a plate surface (joint surface) 722e on a side of the coolant side blocking intermediate plate member 723. The coolant side blocking intermediate plate member 723 is formed with a fourth groove portion 80d having a configuration recessed in a plate surface (joint surface) 723b on a side of the coolant side communication intermediate plate member 722.

Thus, in the joint portions of the coolant side plate header member 721 and the coolant side communication intermediate plate member 722, the first groove portion 80a and the second groove portion 80b each configure a part of the groove portion 80. In the joint portions of the coolant side communication intermediate plate member 722 and the coolant side blocking intermediate plate member 723, the third groove portion 80c and the fourth groove portion 80d each configure a part of the groove portion 80.

In an example of FIG. 25, the coolant side plate header member 721 is formed with a first groove portion 80e. The first groove portion 80e is a through-groove that penetrates through both sides of the coolant side plate header member 721.

Also, the coolant side communication intermediate plate member 722 is formed with a second groove portion 80f. The second groove portion 80f is disposed to extend from a region corresponding to one end of the first groove portion 80e on the upstream side in the flow direction X of the outside air to an end of the coolant side communication intermediate plate member 722 on the upstream side, and is opened toward the outer space B on the upstream side. Further, the coolant side communication intermediate plate member 722 is formed with a third groove portion 80g. The third groove portion 80g is disposed to extend from a region corresponding to the other end of the first groove portion 80e on the downstream side in the flow direction X of the outside air to the end of the coolant side communication intermediate plate member 722 on the downstream side, and is opened toward the outer space B on the downstream side. Each of the second and third groove portions 80f and 80g formed in the coolant side communication intermediate plate member 722 is a through-groove that penetrates through both sides of the coolant side communication intermediate plate member 722.

Also, the coolant side blocking intermediate plate member 723 is formed with a fourth groove portion 80h. The fourth groove portion 80h is disposed to extend from a region corresponding to one end of the first groove portion 80e to a region corresponding to the other end of the first groove portion 80e. The fourth groove portion 80h is not the through-groove, but has a configuration recessed in the plate surface (joint surface) 723b of the coolant side blocking intermediate plate member 723 on a side of the coolant side communication intermediate plate member 722.

In this way, the first to fourth groove portions 80e, 80f, 80g, and 80h each configure a part of the groove portion 80 in one or both the joint portion between the coolant side plate header member 721 and the coolant side communication intermediate plate member 722 and the joint portion between the coolant side communication intermediate plate member 722 and the coolant side blocking intermediate plate member 723.

As illustrated in FIG. 25, the first groove portion 80e of the coolant side plate header member 721 is communicated with a part of the second groove portion 80f of the coolant side communication intermediate plate member 722 at one end of the first groove portion 80e, and also communicated with a part of the third groove portion 80g of the coolant side communication intermediate plate member 722 at the other end of the first groove portion 80e. Also, the fourth groove portion 80h of the coolant side blocking intermediate plate member 723 is communicated with a part of the second groove portion 80f of the coolant side communication intermediate plate member 722 at one end of the fourth groove portion 80h, and also communicated with a part of the third groove portion 80g of the coolant side communication intermediate plate member 722 on the other end of the fourth groove portion 80h.

With the above configuration, one groove space is formed within the groove portion 80 combining the first to fourth groove portions 80*e*, 80*f*, 80*g*, and 80*h* together, and the groove space is continuously connected to the outer space B of the heat exchanger 16. Specifically, the groove portion 80 is opened to a space on a core side where the refrigerant tubes 61 and the coolant tubes 71 are stacked on each other in the external spaces B of the heat exchanger 16, and is opened to spaces on the upstream side and the downstream side in the flow direction X of the outside air.

Also, the groove portion 80 partially includes the first to third groove portions 80*e*, 80*f*, and 80*g* which are through-grooves as described above, and in short, includes at least a part of the through-grooves.

In an example of FIG. 26, in the coolant side plate header member 721, a first groove portion 80*i* is formed on the upstream side, and a second groove portion 80*j* is formed to be distant from the first groove portion 80*i* on the downstream side in the flow direction X of the outside air. The first and second groove portions 80*i* and 80*j* are through-grooves that penetrate through both sides of the coolant side plate header member 721, and are opened to a space on the core side in the outer space B of the heat exchanger 16. In the flow direction X of the outside air, the first groove portion 80*i* extends further upstream of an upstream end of a joint portion of the coolant side plate header member 721 and the coolant side communication intermediate plate member 722. The second groove portion 80*j* extends further downstream of a downstream end of that joint portion.

Also, the coolant side communication intermediate plate member 722 is formed with a third groove portion 80*k*. The third groove portion 80*k* is disposed to extend from a region corresponding to a downstream end of the first groove portion 80*i* to a region corresponding to an upstream end of the second groove portion 80*j* in the flow direction X of the outside air. The third groove portion 80*k* is a through-groove that penetrates through both sides of the coolant side communication intermediate plate member 722.

Also, the coolant side blocking intermediate plate member 723 is formed with a fourth groove portion 80*m*, a fifth groove portion 80*n*, and a sixth groove portion 80*p*. The fourth groove portion 80*m* and the fifth groove portion 80*n* are not the through-grooves, but each have a configuration recessed in the plate surface 723*b* of the coolant side blocking intermediate plate member 723. Also, in the flow direction X of the outside air, the fourth groove portion 80*m* is disposed to extend from a region corresponding to an upstream end of the third groove portion 80*k* to an upstream end edge of the coolant side blocking intermediate plate member 723. The fifth groove portion 80*n* is disposed to extend from a region corresponding to a downstream end of the third groove portion 80*k* to a downstream end edge of the coolant side blocking intermediate plate member 723.

The sixth groove portion 80*p* is a through-groove that penetrates through both sides of the coolant side blocking intermediate plate member 723, and is formed in a region corresponding to the center portion 724*a* of the coolant side tank head member 724, specifically, a region between the coolant distribution space 72*a* and the coolant collection space 72*b* in the flow direction X of the outside air. That is, the sixth groove portion 80*p* is disposed to be communicated with none of the coolant distribution space 72*a* and the coolant collection space 72*b*.

Also, the center portion 724*a* of the coolant side tank head member 724 is formed with a through-hole 724*b* that penetrates through both sides of the coolant side tank head member 724 so as to overlap with the sixth groove portion 80*p*. For that reason, the sixth groove portion 80*p* is opened to a space on a side opposite to the core side in the outer space B of the heat exchanger 16 through the through-hole 724*b*. In this way, the first to sixth groove portions 80*i*, 80*j*, 80*k*, 80*m*, 80*n*, and 80*p* each configure a part of the groove portion 80 in one or both the joint portion between the coolant side plate header member 721 and the coolant side communication intermediate plate member 722 and a joint portion between the coolant side communication intermediate plate member 722 and the coolant side blocking intermediate plate member 723.

As illustrated in FIG. 26, in the flow direction X of the outside air, an upstream end of the third groove portion 80*k* formed in the coolant side communication intermediate plate member 722 is communicated with each of a part of the first groove portion 80*i* and a part of the fourth groove portion 80*m*. A downstream end of the third groove portion 80*k* is communicated with each of a part of the second groove portion 80*j* and a part of the fifth groove portion 80*n*. Also, the third groove portion 80*k* is communicated with the sixth groove portion 80*p* in a part between the fourth groove portion 80*m* and the fifth groove portion 80*n*.

With the above configuration, one groove space is formed within the groove portion 80 combining the first to sixth groove portions 80*i*, 80*j*, 80*k*, 80*m*, 80*n*, and 80*p* together, and the groove space is continuously connected to the outer space B of the heat exchanger 16. Specifically, the groove portion 80 is opened to a space on a core side, a space at a side opposite to the core side, and spaces on the upstream side and the downstream side in the flow direction X of the outside air, in the outer space B of the heat exchanger 16.

Also, the groove portion 80 partially includes the first to third, and sixth groove portions 80*i*, 80*j*, 80*k* and 80*p* which are through-grooves as described above, and in short, includes at least a part of the through-grooves.

As described above, according to the examples of FIGS. 24 to 26, the groove portions 80 are formed in each of a pair of plate surfaces 721*e*, 722*d*, 722*e*, and 723*b* that are joined to and face each other in at least a pair of members that are joined to each other among the coolant side plate header member 721, the coolant side communication intermediate plate member 722, and the coolant side blocking intermediate plate member 723.

Parts of the two groove portions 80 (for example, first and second groove portions 80*a* and 80*b*) formed in each pair of plate surfaces 721*e*, 722*d*, 722*e*, and 723*b* are communicated with each other to form one groove space within the groove portion 80. The groove space is continuously connected to the outer space B of the heat exchanger 16. For that reason, even if the groove space within the groove portion 80 cannot be continued to the outer space B by merely forming the groove portions 80 into one member, the groove space can be continued to the outer space B.

Also, according to the examples of FIGS. 25 and 26, the groove portions 80 include at least a part of the through-grooves 80*e*, 80*f*, 80*g*, 80*i*, 80*j*, 80*k*, and 80*p* that penetrate through both sides of the member in which the groove portions 80 are formed among the coolant side plate header member 721, the coolant side communication intermediate plate member 722, and the coolant side blocking intermediate plate member 723. Therefore, in the through-grooves 80*e*, 80*f*, 80*g*, 80*i*, 80*j*, 80*k*, and 80*p*, the refrigerant or the coolant leaked into the groove portion 80 can be communicated from a front side of the member in which the groove portion 80 is formed to a rear side thereof. The groove portion 80 allowing the refrigerant or the coolant to be easily communicated in the groove space can be configured.

Also, according to the examples of FIGS. 25 and 26, the through-grooves 80e, 80i, 80j, and 80p are opened to a space on the core side where the refrigerant tubes 61 and the coolant tubes 71 are stacked, or a space on a side opposite to the core side, in the outer space B of the heat exchanger 16. This leads to such advantages that the groove portions 80 are easily formed so that the refrigerant or the coolant leaked into the groove space within the groove portion 80 is easily discharged.

(5) In the above-mentioned first embodiment, the example in which the refrigerant of the heat pump cycle 10 is employed as the first fluid, the coolant of the coolant circulation circuit 40 is employed as the second fluid, and the outside air blown by the air blowing fan 17 is employed as the third fluid has been described. However, the first to third fluids are not limited to this example. For example, as in the third embodiment, the vehicle interior blowing air may be employed as the third fluid.

For example, the first fluid may be a high pressure refrigerant of the heat pump cycle 10, or a low pressure refrigerant.

For example, the second fluid may be made of the coolant for cooling an electric equipment such as an inverter that supplies an electric power to an engine, the travel electric motor MG. Also, a cooling oil may be employed as the second fluid, and the second heat exchange unit may function as an oil cooler, or a thermal storage agent or a cold storage agent may be employed as the second fluid.

Further, when the heat pump cycle 10 employing the heat exchanger 16 of the present disclosure is applied to a stationary air conditioner, a cold storage warehouse, or a cooling heating device for a vending machine, a coolant for cooling an engine, an electric motor, and other electric equipments as a drive source of a compressor in the heat pump cycle 10 may be employed as the second fluid.

Further, in the above-mentioned embodiment, the example in which the heat exchanger 16 of the present disclosure is applied to the heat pump cycle (refrigeration cycle) has been described. However, the application of the heat exchanger 16 according to the present disclosure is not limited to this example. That is, the heat exchanger 16 can be extensively applied to devices for conducting the heat exchange among three types of fluids.

(6) In the above-mentioned embodiment, the example in which the refrigerant tubes 61 of the vehicle exterior heat exchange unit 60, the coolant tubes 71 of the radiator unit 70, and the outer fins 50 are made of aluminum alloy (metal), and joined to each other by brazing has been described. Alternatively, the outer fins 50 may be made of another material excellent in conductivity (for example, carbon nanotube), and joined by joining means such as adhesive.

(7) In the above-mentioned embodiment, the example in which the electric three-way valve 42 is employed as a circuit switching device for switching the cooling medium circuit of the coolant circulation circuit 40 has been described. However, the circuit switching device is not limited to this example. For example, a thermostat valve may be employed. The thermostat valve is a cooling medium temperature responsive value configured by a mechanical mechanism that opens or closes a cooling medium passage by displacing a valve body through a thermowax (temperature sensitive member) that is changed in volume according to a temperature. Therefore, with the application of the thermostat valve, the coolant temperature sensor 52 can be omitted.

(8) In the above-mentioned embodiment, the example in which the normal fluorocarbon refrigerant is employed as the refrigerant has been described. However, the kind of refrigerant is not limited to this example. A natural refrigerant such as carbon dioxide, or a carbon hydrogen-based refrigerant may be employed. The heat pump cycle 10 may configure a supercritical refrigeration cycle in which the compressor 11 discharge refrigerant becomes equal to or higher than a critical pressure of the refrigerant.

(9) In the above-mentioned embodiment, the coolant side header tank 72 is configured by stacking the coolant side plate header member 721, the coolant side communication intermediate plate member 722, and the coolant side blocking intermediate plate member 723 in the thickness direction, and the refrigerant side header tank 62 is also configured in the same manner. However, one of the coolant side header tank 72 and the refrigerant side header tank 62 may not have a configuration in which the plate-like members are stacked on each other.

(10) In the above-mentioned embodiment, a relationship between the different types of tubes 61 and 71 in which the different type of fluids (for example, refrigerant and coolant) flow has been mainly described. However, the present disclosure may be applied to a relationship of the different type of fluid enclosure spaces into which the different types of fluids are enclosed.

(11) In the above-mentioned embodiment, the tubes 61 and 71 are stacked in two rows on the upstream side and the downstream side in the flow direction X of the outside air. However, those tubes may be stacked in one row or three or more rows.

The present disclosure is not limited to the above-mentioned embodiments, and can be appropriately changed. Also, the respective embodiments are not unrelated to each other, and can be appropriately combined together unless the combination is clearly impossible. Further, needless to say, in the respective embodiments, constituent elements of the embodiments are not always essential unless the constituent elements are clearly specified to be particularly essential, or unless the constituent elements are obviously considered essential on a theoretical basis. In addition, in the respective embodiments, when the number including count, figure, amount and range, etc. of the constituent elements of the embodiments is mentioned, the number of constituent elements is not limited to a specific number unless the number is clearly specified to be particularly essential, or unless the number is definitely limited to the specific number in principle. Further, when shapes and positional relationships, etc. of the constituent elements, etc. are mentioned in the respective embodiments, the shapes and the positional relationships, etc. are not limited to specific shapes or positional relationship, etc. unless the shapes and the positional relationship is clearly specified to be particularly essential, or unless the shapes and the positional relationship is definitely limited to the specific shapes and positional relationship, etc. in principle.

The invention claimed is:

1. A heat exchanger, comprising:
a first heat exchange unit including first tubes through which a first fluid flows, and a first tank that extends in a stacking direction of the first tubes and collects or distributes the first fluid flowing through the first tubes, the first heat exchange unit performing heat exchange between the first fluid and a third fluid flowing on a periphery of the first tubes;
a second heat exchange unit including second tubes through which a second fluid flows, and a second tank that extends in a stacking direction of the second tubes and collects or distributes the second fluid flowing through the second tubes, the second heat exchange unit performing heat exchange between the second fluid and the third fluid flowing on a periphery of the second tubes;

a third fluid passage through which the third fluid flows; and an outer fin, wherein at least one of the first tubes is arranged between the second tubes, at least one of the second tubes is arranged between the first tubes, the third fluid passage is formed between the first tubes and the second tubes, the outer fin is arranged in the third fluid passage, facilitates the heat exchanges in both of the heat exchange units, and enables heat transfer between the first fluid flowing in the first tubes and the second fluid flowing in the second tubes, at least one of the first and second tanks includes a plate-shaped plate header member connected with one end side of the first and second tubes in a longitudinal direction thereof, a plate-shaped communication intermediate plate member, a plate-shaped blocking intermediate plate member, and a tank header member, the communication intermediate plate member has a first fluid communication hole through which the first fluid flows, and a second fluid communication hole through which the second fluid flows, and the first and second fluid communication holes penetrate through both plate surfaces of the communication intermediate plate member, the blocking intermediate plate member closes one of the first and second fluid communication holes, and has a communication hole that penetrates through both plate surfaces of the blocking intermediate plate member, the tank header member has an internal space that collects or distributes the first or second fluids, the other of the first and second fluid communication holes, and the communication hole communicate with each other, so that the internal space defined by the tank header member and one of the first tubes or second tubes communicate with each other, two of the other of the first tubes or second tubes, which are arranged adjacent to each other as one pair, communicate with each other through the one of the first and second fluid communication holes (722a, 622b), and the plate surface of the plate header member and one plate surface of the communication intermediate plate member are joined to each other, and the other plate surface of the communication intermediate plate member and the plate surface of the blocking intermediate plate member are joined to each other, so that mixing of the first fluid flowing in the first fluid communication hole and the second fluid flowing in the second fluid communication hole is limited.

2. The heat exchanger according to claim 1, further comprising a groove portion, wherein the groove portion is formed in at least one of the plate surface of the plate header member, the one or the other plate surface of the communication intermediate plate member, or the plate surface of the blocking intermediate plate member, the groove portion is located between the first fluid communication hole and the second fluid communication hole which are adjacently arranged, and a groove space formed within the groove portion is continuously connected to an external space of the heat exchanger.

3. The heat exchanger according to claim 1, further comprising a groove portion, wherein the groove portion is formed in at least one of the plate surface of the plate header member, the one or the other plate surface of the communication intermediate plate member, or the plate surface of the blocking intermediate plate member, the groove portion is located between the first fluid communication hole and the second fluid communication hole which are adjacently arranged, and the groove portion extends to an end portion of the plate surface in the plate header member, the communication intermediate plate member, or the blocking intermediate plate member, in which the groove portion (80) is formed.

4. The heat exchanger according to claim 3, wherein the groove portion is formed on the plate surface of the communication intermediate plate member, the groove portion is located between the first fluid communication hole and the second fluid communication hole which are adjacently arranged, and the groove portion extends to an end portion of the plate surface in which the groove portion (80) is formed.

5. The heat exchanger according to claim 3, wherein a groove space formed in the groove portion communicates with an external space of the heat exchanger.

6. The heat exchanger according to claim 2, wherein an end of the groove portion is positioned visibly.

7. The heat exchanger according to claim 2, wherein at least two members of the plate header member, the communication intermediate plate member, or the blocking intermediate plate member are joined to each other, the groove portion is formed in each of the joined plate surfaces of the at least two members, parts of the groove portions formed in the at least two members communicates with each other to provide a single groove space within the groove portions, and the groove space is continuously connected to the external space of the heat exchanger.

8. The heat exchanger according to claim 2, wherein the groove portion includes a through-groove that penetrates through one member, in which the groove portion is formed, among the plate header member, the communication intermediate plate member, and the blocking intermediate plate member.

9. The heat exchanger according to claim 8, wherein the through-groove is open toward the first and second tubes, or open toward a side opposite from the first and second tubes, and communicates with the external space.

10. The heat exchanger according to claim 2, wherein the groove portion is provided along a curved or a polygonal line.

11. The heat exchanger according to claim 1, wherein the first and second tubes are arranged in two rows intersecting the flow direction of the third fluid, and upstream one of the pair of the other of the first tubes or second tubes in the flow direction of the third fluid and downstream one of the pair of the other of the first tubes or second tubes in the flow direction of the third fluid communicate with each other through the one of the first or second fluid communication hole.

12. The heat exchanger according to claim 1, being used as an evaporator that evaporates a refrigerant in a vapor compression refrigeration cycle, wherein the first fluid is a refrigerant of the refrigeration cycle, the second fluid is a heat medium that absorbs heat of an external heat source, and the third fluid is air.

13. The heat exchanger according to claim 1, being used as a radiator that radiates a refrigerant discharged by a compressor in a vapor compression refrigeration cycle, wherein
- the first fluid is a refrigerant of the refrigeration cycle,
- the second fluid is a heat medium that absorbs heat of an external heat source, and
- the third fluid is air.

14. The heat exchanger according to claim 1, being applied to a vehicle cooling system, wherein
- the first fluid is a heat medium that absorbs heat of a first in-vehicle device associated with heat generation during actuation,
- the second fluid is a heat medium that absorbs heat of a second in-vehicle device associated with heat generation during actuation, and
- the third fluid is air.

* * * * *